United States Patent
Abe et al.

(10) Patent No.: US 8,531,768 B2
(45) Date of Patent: Sep. 10, 2013

(54) ZOOM LENS SYSTEM

(75) Inventors: Tetsuya Abe, Hokkaido (JP); Masaru Eguchi, Saitama (JP); Toshiki Nakamura, Saitama (JP)

(73) Assignee: Hoya Corporation, Tokyo (JP)

( * ) Notice: Subject to any disclaimer, the term of this patent is extended or adjusted under 35 U.S.C. 154(b) by 47 days.

(21) Appl. No.: 13/415,189

(22) Filed: Mar. 8, 2012

(65) Prior Publication Data
US 2012/0243107 A1 Sep. 27, 2012

(30) Foreign Application Priority Data
Mar. 24, 2011 (JP) .................................. 2011-065224

(51) Int. Cl.
*G02B 15/14* (2006.01)

(52) U.S. Cl.
USPC ........... 359/557; 359/680; 359/682; 359/683; 359/684; 359/685; 359/689; 359/716; 359/740; 359/784

(58) Field of Classification Search
USPC ................. 359/557, 680, 682–685, 689, 716, 359/740, 784
See application file for complete search history.

(56) References Cited

U.S. PATENT DOCUMENTS

| | | | |
|---|---|---|---|
| 5,835,272 A * | 11/1998 | Kodama | 359/557 |
| 5,847,875 A * | 12/1998 | Kodama et al. | 359/557 |
| 6,498,688 B2 * | 12/2002 | Shibayama | 359/689 |
| 6,671,103 B2 * | 12/2003 | Itoh | 359/689 |
| 6,771,430 B2 * | 8/2004 | Obama | 359/682 |
| 7,042,650 B2 * | 5/2006 | Hagimori et al. | 359/682 |
| 7,215,483 B2 * | 5/2007 | Sekita | 359/682 |
| 7,221,517 B2 * | 5/2007 | Terada et al. | 359/682 |
| 7,324,289 B2 * | 1/2008 | Iijima | 359/689 |
| 7,589,906 B2 * | 9/2009 | Ito | 359/682 |
| 7,738,183 B2 * | 6/2010 | Ito | 359/682 |
| 7,742,236 B2 * | 6/2010 | Ohata | 359/682 |
| 7,773,311 B2 * | 8/2010 | Endo | 359/686 |
| 2008/0043341 A1 * | 2/2008 | Ori | 359/682 |
| 2009/0257130 A1 * | 10/2009 | Iwama | 359/682 |
| 2010/0238560 A1 * | 9/2010 | Fujimoto | 359/682 |
| 2010/0254023 A1 * | 10/2010 | Ito | 359/682 |
| 2010/0265594 A1 * | 10/2010 | Matsui et al. | 359/682 |
| 2011/0026131 A1 * | 2/2011 | Ito | 359/682 |

FOREIGN PATENT DOCUMENTS

| | | |
|---|---|---|
| JP | 06-175027 | 6/1994 |
| JP | 2003-215451 | 7/2003 |
| JP | 4067828 | 1/2008 |

* cited by examiner

*Primary Examiner* — Evelyn A. Lester
(74) *Attorney, Agent, or Firm* — Greenblum & Bernstein P.L.C.

(57) ABSTRACT

A zoom lens system includes a negative first lens group, a positive second lens group, and a positive third lens group, in that order from the object side, wherein upon zooming from the short to long focal length extremities, the distance between the first lens group and the second lens group decreases, and the distance between the second lens group and the third lens group increases. The second lens group includes a positive first sub-lens group and a negative second sub-lens group, in that order from the object side. In at least part of the zooming range of the zoom lens system, the second sub-lens group and the third lens group each serves as a focusing lens group that is moved along the optical axis during a focusing operation.

16 Claims, 17 Drawing Sheets

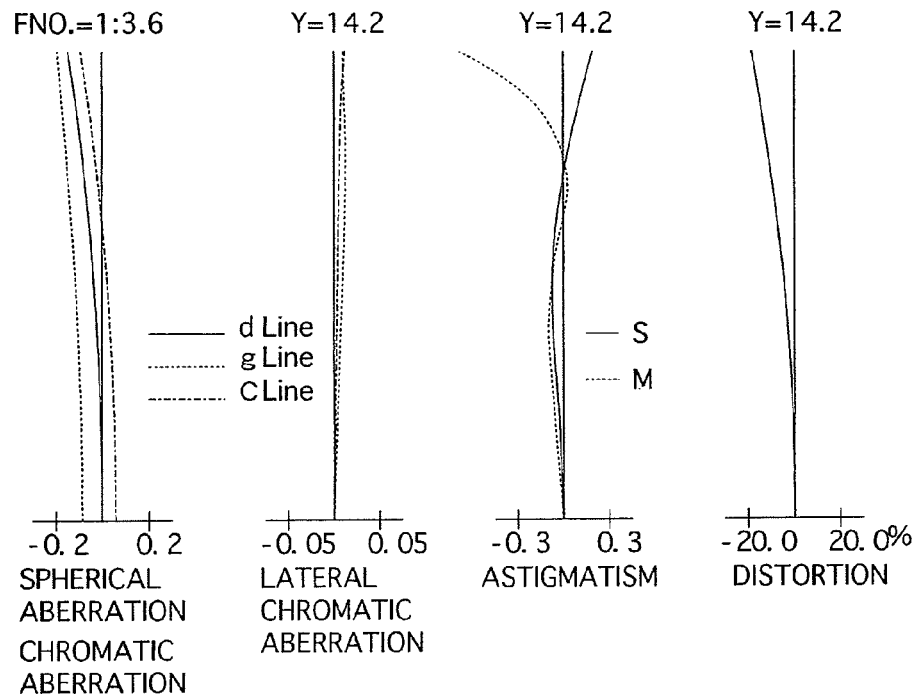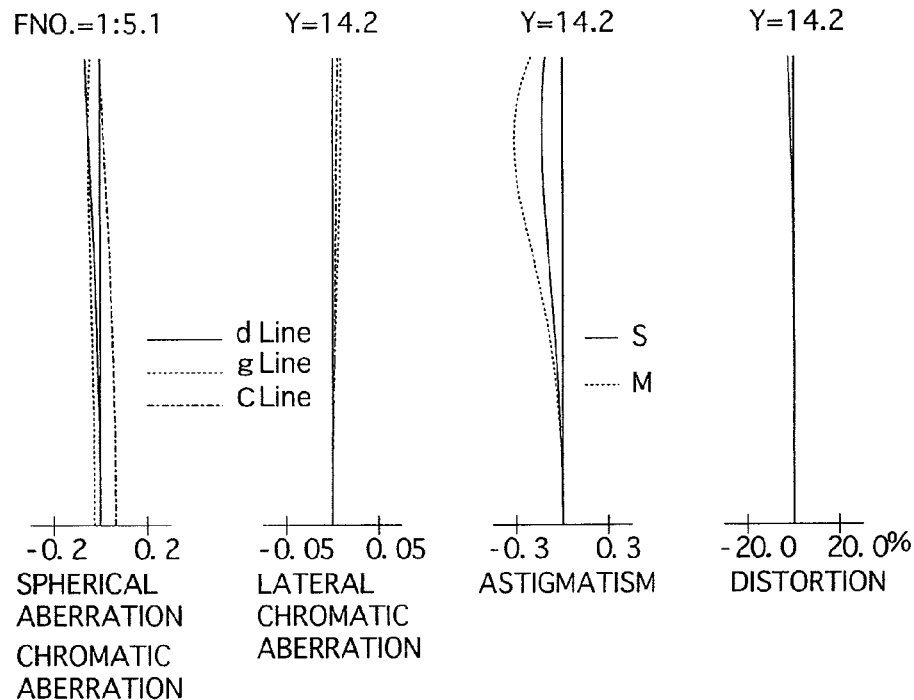

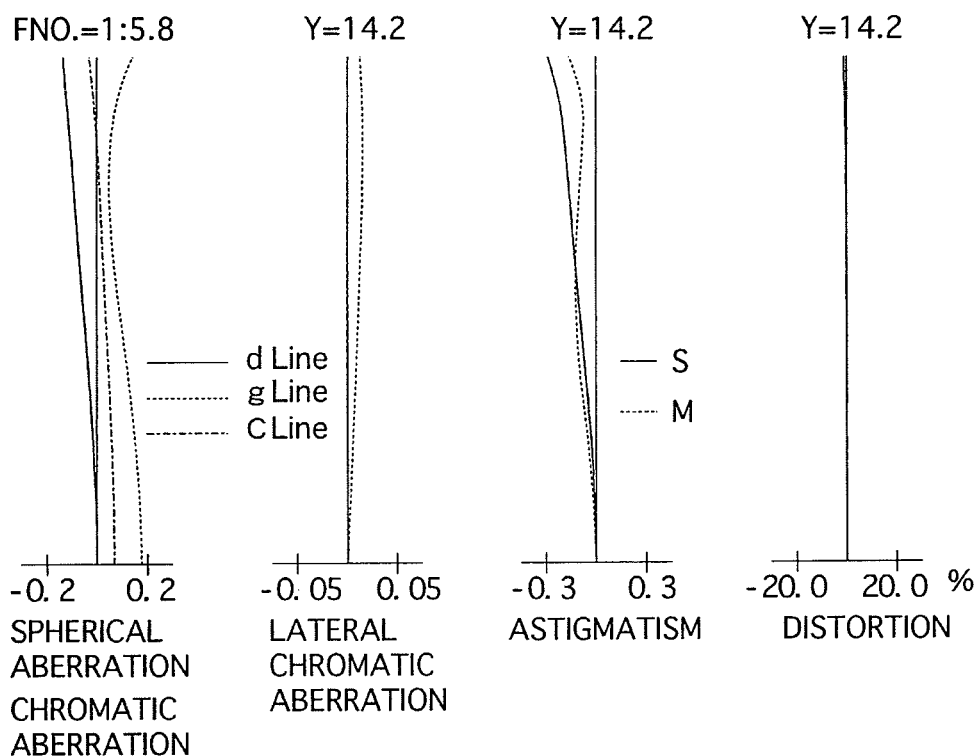

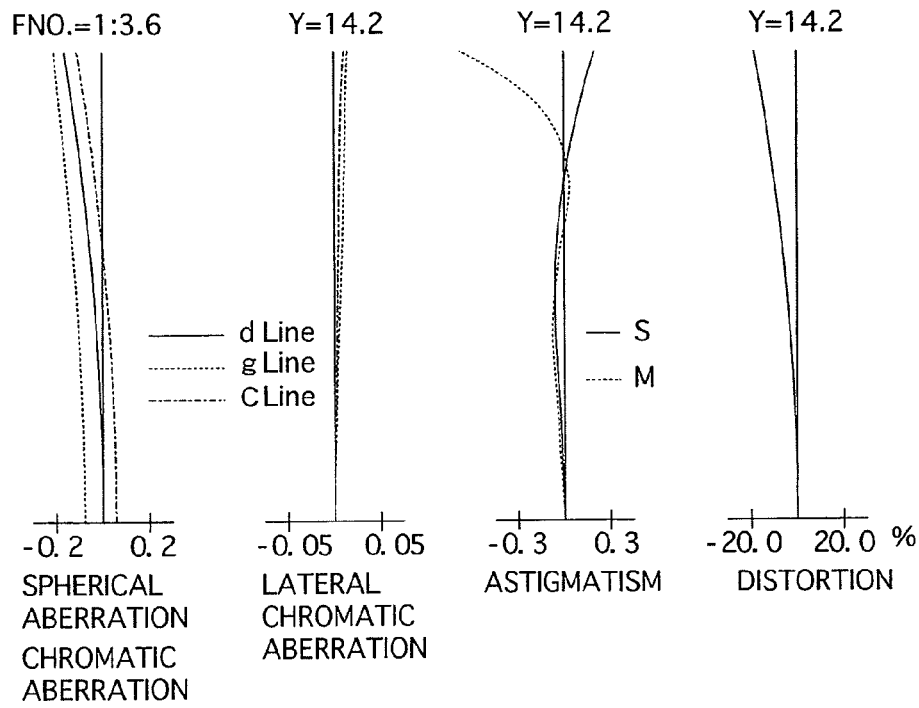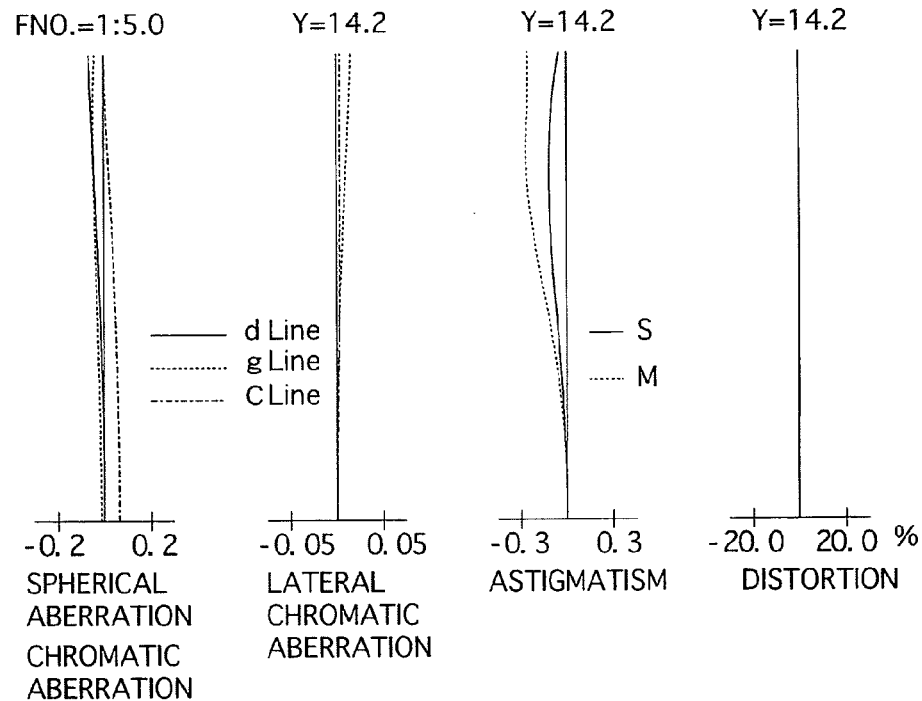

FNO.=1:5.8

-0.2  0.2
SPHERICAL
ABERRATION
CHROMATIC
ABERRATION

— d Line
····· g Line
-·-·- C Line

Y=14.2

-0.05  0.05
LATERAL
CHROMATIC
ABERRATION

Y=14.2

— S
····· M

-0.3  0.3
ASTIGMATISM

Y=14.2

-20.0  20.0 %
DISTORTION

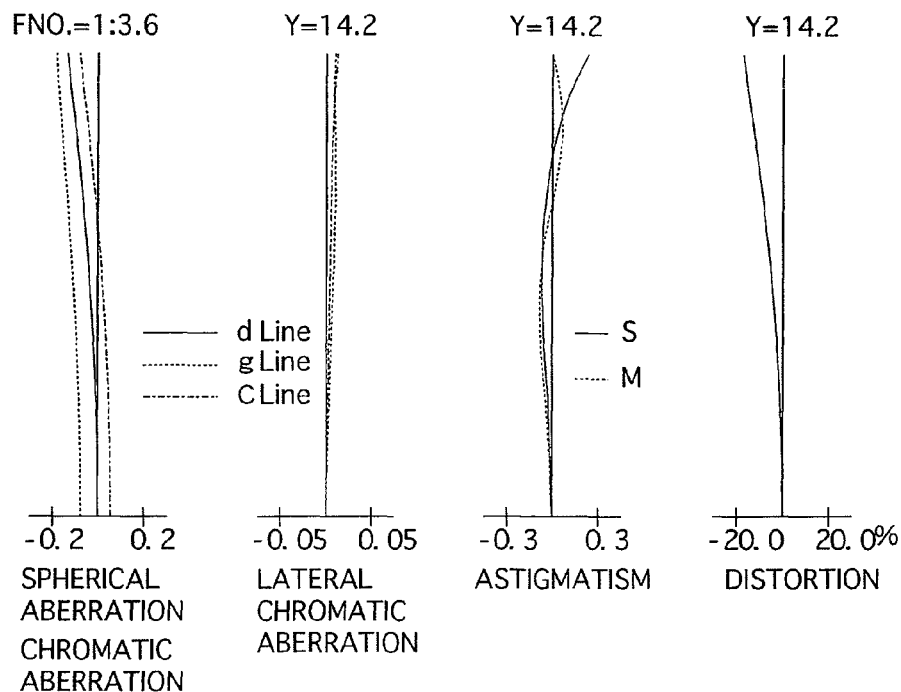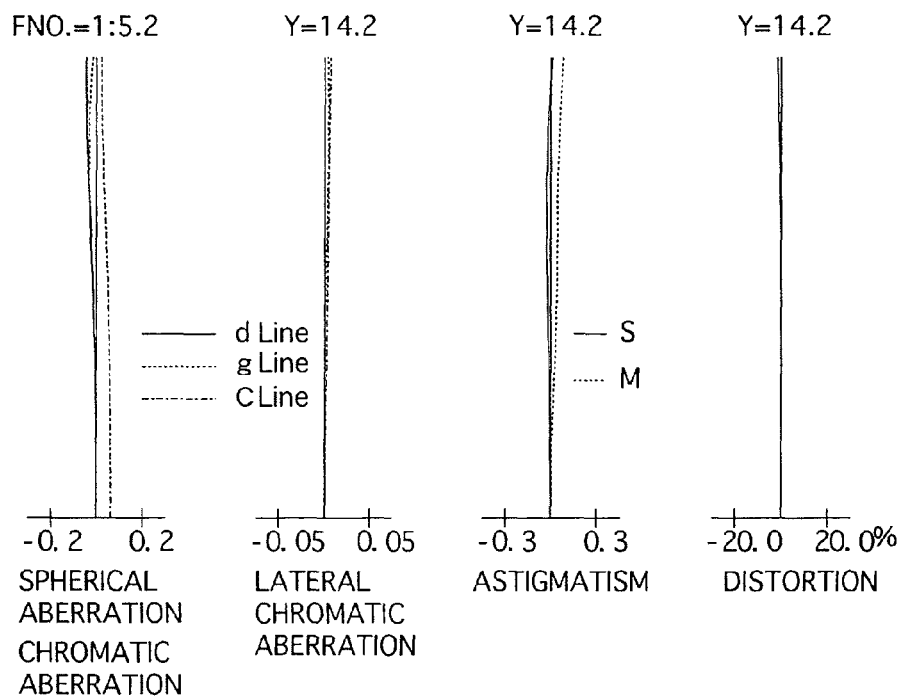

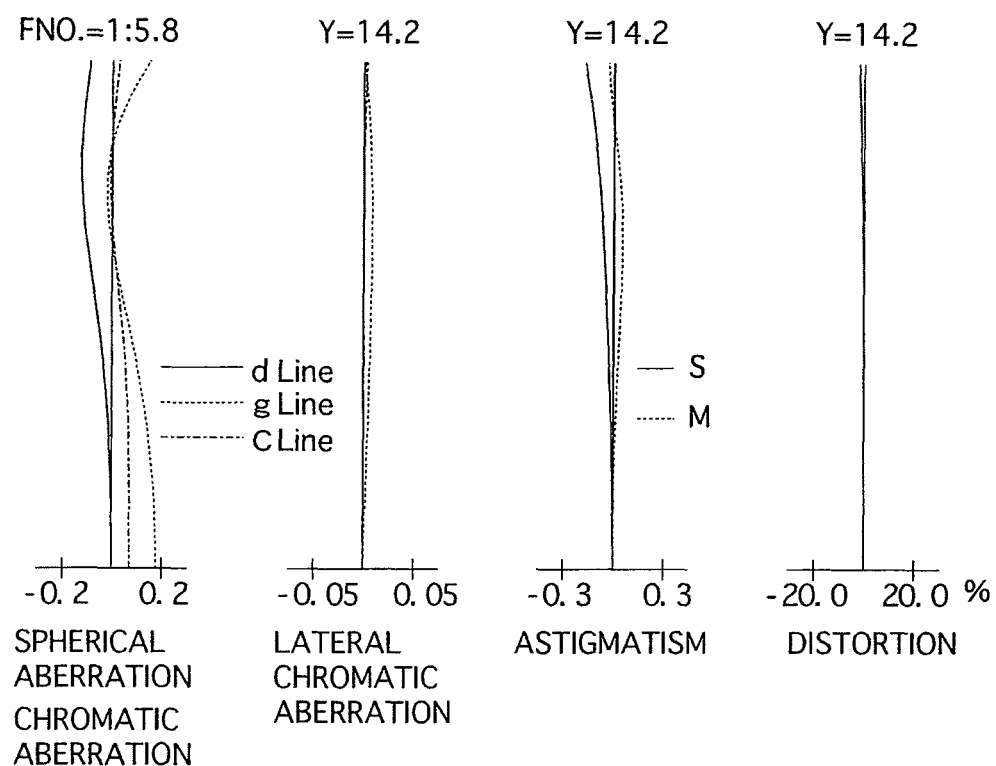

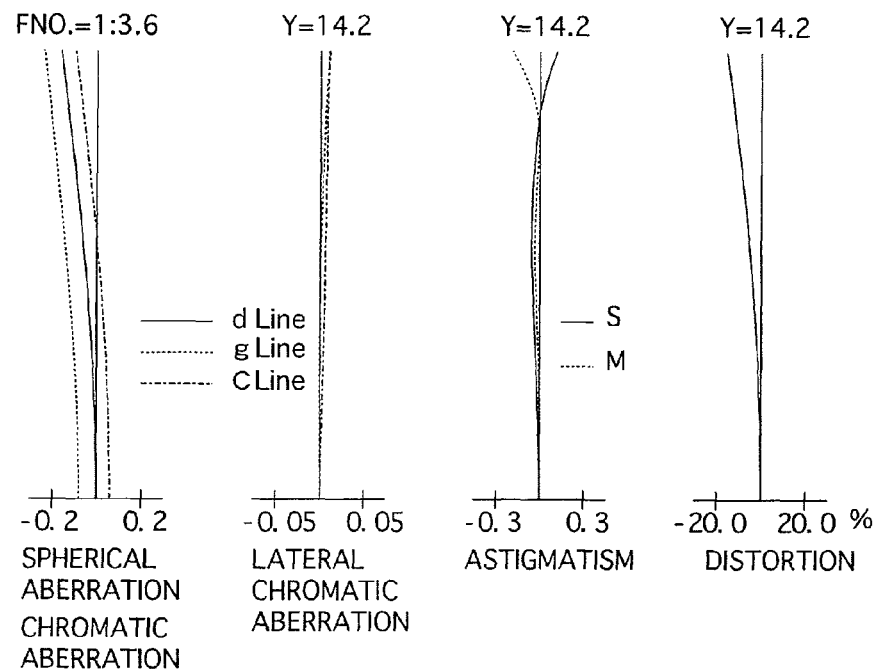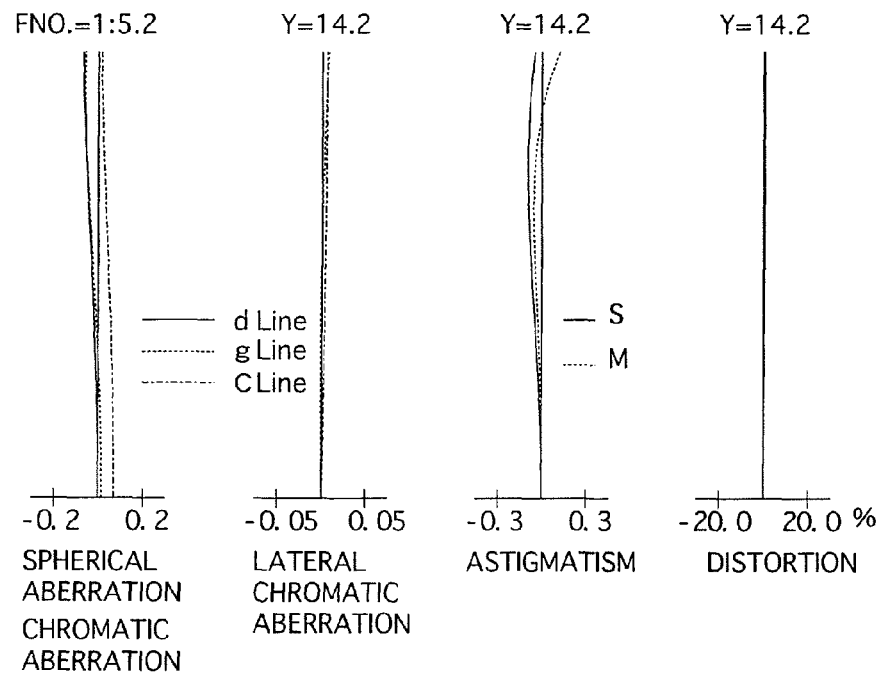

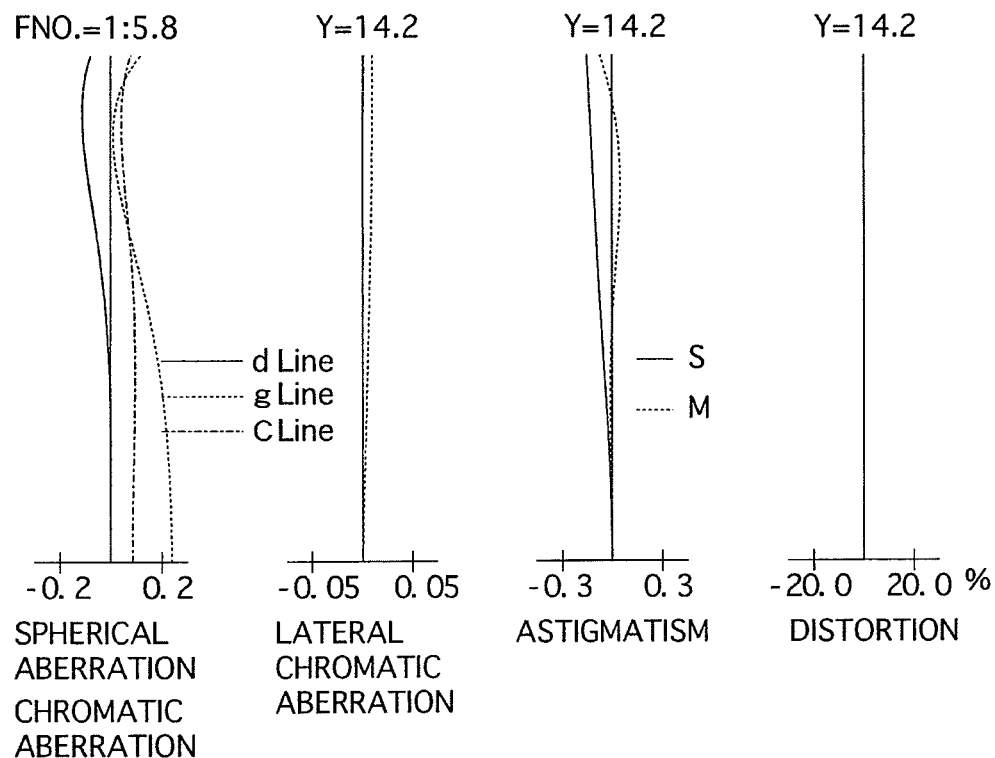

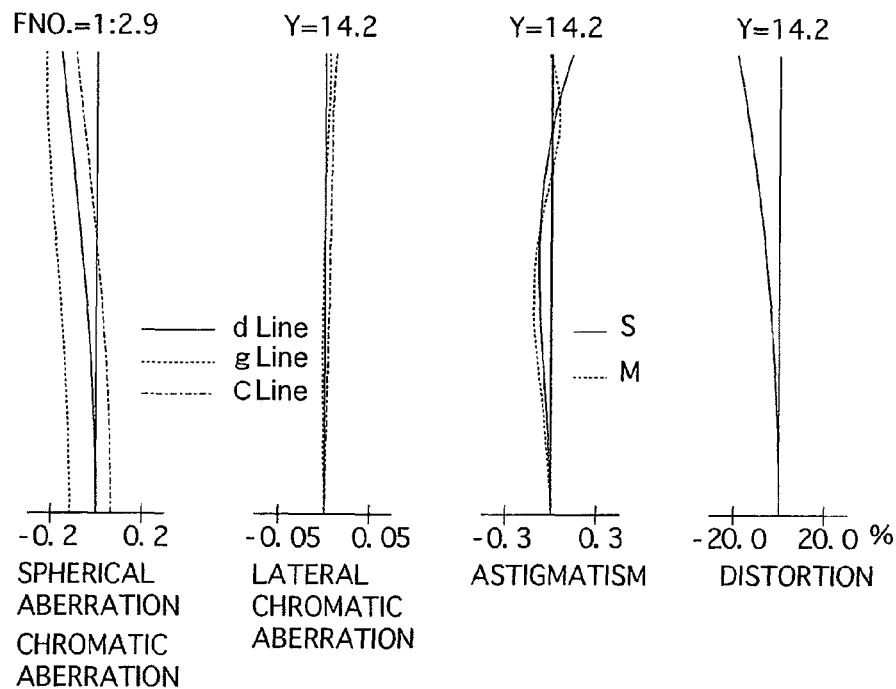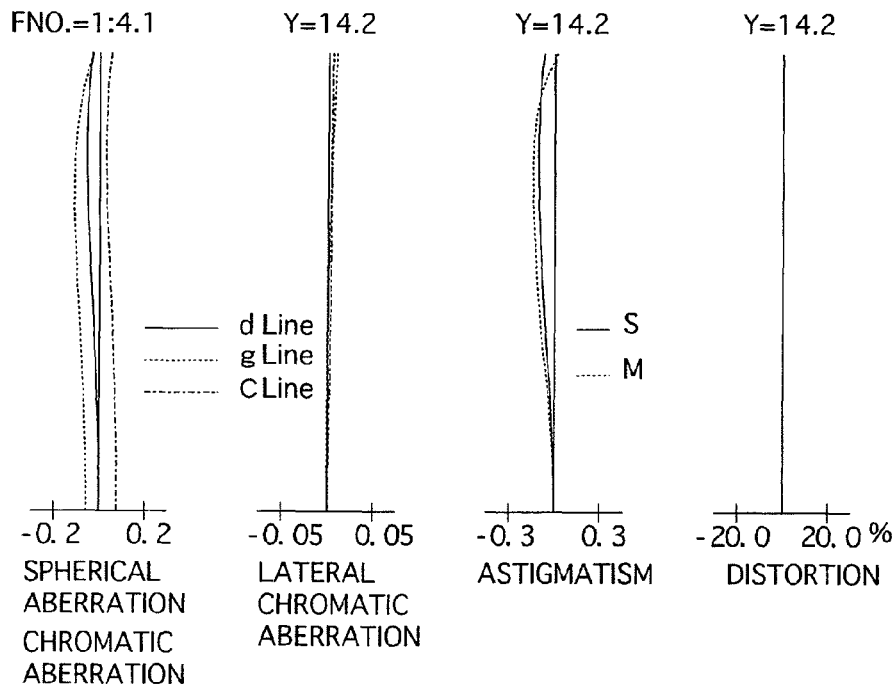

FNO.=1:5.7   Y=14.2   Y=14.2   Y=14.2

——— d Line
············ g Line
— — C Line

——— S
------- M

-0.2   0.2   -0.05  0.05   -0.3   0.3   -20.0   20.0 %
SPHERICAL    LATERAL       ASTIGMATISM   DISTORTION
ABERRATION   CHROMATIC
CHROMATIC    ABERRATION
ABERRATION

ZOOM LENS SYSTEM

BACKGROUND OF THE INVENTION

1. Field of the Invention

The present invention relates to a zoom lens system.

2. Description of Related Art

An image sensor used in a compact digital camera typically has a size of about 1/2.5-inch through 1/1.7-inch, in which high pixelization is achieved by miniaturizing the pixel pitch. However, in recent years, the pixel pitch has been reduced down to approximately 1 through 2 µm, and further improvement of the image quality cannot be expected. One way to achieve high pixelization is to use a large-sized image sensor in which the pixel pitch can be enlarged even in a compact digital camera. However, if the image sensor is enlarged, the optical system also increases in size to the extent that such an optical system cannot be accommodated in a compact digital camera. In particular, in a focusing method of the related art in which an entire lens group (so as to constitute a focusing lens group) such as a frontmost lens group or rearmost lens group is moved along the optical axis direction, it is difficult to miniaturize a lens unit which includes a focusing mechanism for such a focusing lens group.

A zoom lens system having three lens groups, i.e., a negative lens group, a positive lens group and a negative lens group, in that order from the object side, and a zoom lens system that has favorable telecentricity having a negative lens group, a positive lens group and a positive lens group, in that order from the object side, are known in the art as examples of lens systems which are aimed at achieving a wide angle-of-view and a reduced length in the optical axis direction. However, in the former zoom lens system, since focusing is often carried out by the first lens group that has a large outer diameter, a problem occurs with the mechanical burden being large. In the latter zoom lens system, although it is possible for focusing to be carried out by the third lens group, since the optical quality when focused at a close distance easily deteriorates at the long focal length extremity and since the amount of movement of the focusing lens group along the optical axis increases, the minimum photographic distance cannot be shortened.

A zoom lens system having three lens groups, i.e., a negative lens group, a positive lens group and a positive lens group, in that order from the object side, is disclosed in Japanese Patent No. 4,067,828, which is aimed at achieving a reduction in weight of the focusing lens group by using the lens element provided closest to the image side within the second lens group as a focusing lens group. However, in the zoom lens system disclosed in the above-mentioned Japanese Patent No. 4,067,828, it is difficult to improve the optical quality when focused at a close distance over the entire zooming range from the short focal length extremity to the long focal length extremity, and if this is nevertheless achieved, enlargement of the zoom lens system cannot be avoided. Furthermore, the amount of movement of the focusing lens group differs depending on the zooming range, and if the amount of movement of the focusing lens group is large within the zooming range at the short focal length extremity and the long focal length extremity in which the lens groups closely approach each other, miniaturization of the zoom lens system is hindered.

SUMMARY OF THE INVENTION

The present invention has been devised in view of the above-described problems, and provides a zoom lens system having favorable optical quality when focused at a close distance over the entire zooming range, which achieves miniaturization of the zoom lens system, has a wide angle-of-view, a high zoom ratio and is compatible with a large image sensor.

According to an aspect of the present invention, a zoom lens system including a negative first lens group, a positive second lens group, and a positive third lens group, in that order from the object side, wherein upon zooming from the short focal length extremity to the long focal length extremity, the distance between the first lens group and the second lens group decreases, and the distance between the second lens group and the third lens group increases, wherein the second lens group includes a positive first sub-lens group and a negative second sub-lens group, in that order from the object side. In at least part of the zooming range of the zoom lens system, the second sub-lens group and the third lens group each serves as a focusing lens group that is moved along the optical axis during a focusing operation.

It is desirable for the zoom lens system to include a zooming range in which only the third lens group serves as a focusing lens group, and a zooming range in which the second sub-lens group and the third lens group each serves as a focusing lens group.

It is desirable for the focusing movement amount of the second sub-lens group to be less than the focusing movement amount of the third lens group at the short focal length extremity. It is desirable for the following condition (1) to be satisfied:

$$-0.5 < dW2B/dW3 < 0.2 \tag{1},$$

wherein dW2B designates the focusing movement amount of the second sub-lens group at the short focal length extremity when focused at an arbitrary object distance, wherein a movement direction of the second sub-lens group toward the image side designates a positive focusing-movement direction, and a movement direction of the second sub-lens group toward the object side designates a negative focusing-movement direction, and dW3 designates the focusing movement amount of the third lens group at the short focal length extremity when focused at said arbitrary object distance, wherein a movement direction of the third lens group toward the image side designates a positive focusing-movement direction, and a movement direction of the third lens group toward the object side designates a negative focusing-movement direction.

It is desirable for the ratio of focusing movement amount of the third lens group to the focusing movement amount of the second sub-lens group to change in accordance with a change in the focal length during zooming, wherein the following condition (2) is satisfied:

$$-50 < dX3/dX2B \leq 0 \tag{2},$$

wherein dX3 designates the focusing movement amount of the third lens group at a focal length in a range from an intermediate focal length through to the long focal length extremity when focused at an arbitrary object distance, wherein a movement direction of the third lens group toward the image side designates a positive focusing-movement direction, and a movement direction of the third lens group toward the object side designates a negative focusing-movement direction, and dX2B designates the focusing movement amount of the second sub-lens group at the focal length in the range from the intermediate focal length through to the long focal length extremity when focused at the arbitrary object distance, wherein a movement direction of the second sub-lens group toward the image side designates a positive focusing-movement direction, and a movement direction of the second sub-lens group toward the object side designates a negative focusing-movement direction.

It is desirable for the second sub-lens group and the third lens group to each serve as a focusing lens group in a zooming range from an intermediate focal length fm to the long focal length extremity, wherein fm=(fw*ft)$^{1/2}$, wherein fw designates the focal length of the entire zoom lens system at the short focal length extremity, and ft designates the focal length of the entire zoom lens system at the long focal length extremity.

It is desirable for the focusing movement amounts of the second sub-lens group and the third lens group to change in accordance with the object distance.

It is desirable for the following condition (3) to be satisfied:

$$-1.5 < F2/F2B < -0.7 \quad (3),$$

wherein F2 designates the focal length of the second lens group, and F2B designates the focal length of the second sub-lens group.

The second sub-lens group can be formed from a negative single lens element.

It is desirable for the following condition (4) to be satisfied:

$$0 < (RA+RB)/(RA-RB) < 3 \quad (4),$$

wherein RA designates the radius of curvature of the surface on the object side of the negative single lens element of the second sub-lens group, and RB designates the radius of curvature of the surface on the image side of the negative single lens element of the second sub-lens group.

It is desirable for the following condition (5) to be satisfied:

$$v2B > 45 \quad (5),$$

wherein v2B designates the Abbe number with respect to the d-line of the negative single lens element of the second sub-lens group.

It is desirable for the following condition (6) to be satisfied:

$$T2B/T2 < 0.1 \quad (6),$$

wherein T2B designates the distance along the optical axis from the surface of the second sub-lens group that is closest to the object side to the surface of the second sub-lens group that is closest to the image side (i.e., the thickness of the second sub-lens group in mm), and T2 designates the distance along the optical axis from the surface of the second lens group that is closest to the object side to the surface of the second lens group that is closest to the image side (i.e., the thickness of the second lens group in mm).

It is desirable for the following condition (7) to be satisfied:

$$1.05 < M3T/M3W < 1.35 \quad (7),$$

wherein M3T designates the lateral magnification of the third lens group when focused on an object at infinity at the long focal length extremity, and M3W designates the lateral magnification of the third lens group when focused on an object at infinity at the short focal length extremity.

It is desirable for the first sub-lens group to include a positive lens element, a positive lens element, a negative lens element, and a positive lens element, in that order from the object side.

It is desirable for the first lens group to include a negative lens element, a negative lens element having an aspherical surface on at least one side thereof, and a positive lens element, in that order from the object side, wherein the following condition (8) is satisfied:

$$0 < F1/FA < 0.4 \quad (8),$$

wherein F1 designates the focal length of the first lens group, and FA designates the focal length of the negative lens element, of the first lens group, having an aspherical surface on at least one side thereof.

It is desirable for the third lens group to include a positive single lens element, and wherein the following condition (9) is satisfied:

$$SG3 < 1.5 \quad (9),$$

wherein SG3 designates the specific gravity of the positive single lens element of the third lens group.

According to the present invention, a zoom lens system is provided, having favorable optical quality when focused at a close distance over the entire zooming range, which achieves miniaturization of the zoom lens system, has a wide angle-of-view, a high zoom ratio and is compatible with a large image sensor.

The present disclosure relates to subject matter contained in Japanese Patent Application No. 2011-65224 (filed on Mar. 24, 2011) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the lens arrangement of FIG. 1, at the short focal length extremity;

FIGS. 3A, 3B, 3C and 3D show various aberrations that occurred in the lens arrangement of FIG. 1, at an intermediate focal length;

FIGS. 4A, 4B, 4C and 4D show various aberrations that occurred in the lens arrangement of FIG. 1, at the long focal length extremity;

FIGS. 6A, 6B, 6C and 6D show various aberrations that occurred in the lens arrangement of FIG. 5, at the short focal length extremity;

FIGS. 7A, 7B, 7C and 7D show various aberrations that occurred in the lens arrangement of FIG. 5, at an intermediate focal length;

FIGS. 10A, 10B, 10C and 10D show various aberrations that occurred in the lens arrangement of FIG. 9, at the short focal length extremity;

FIGS. 11A, 11B, 11C and 11D show various aberrations that occurred in the lens arrangement of FIG. 9, at an intermediate focal length;

FIGS. 12A, 12B, 12C and 12D show various aberrations that occurred in the lens arrangement of FIG. 9, at the long focal length extremity;

FIGS. 14A, 14B, 14C and 14D show various aberrations that occurred in the lens arrangement of FIG. 13, at the short focal length extremity;

FIGS. 15A, 15B, 15C and 15D show various aberrations that occurred in the lens arrangement of FIG. 13, at an intermediate focal length;

FIGS. 16A, 16B, 16C and 16D show various aberrations that occurred in the lens arrangement of FIG. 13, at the long focal length extremity;

FIGS. 18A, 18B, 18C and 18D show various aberrations that occurred in the lens arrangement of FIG. 17 at the short focal length extremity;

FIGS. 19A, 19B, 19C and 19D show various aberrations that occurred in the lens arrangement of FIG. 17, at an intermediate focal length;

DESCRIPTION OF THE EMBODIMENTS

Figure 21:
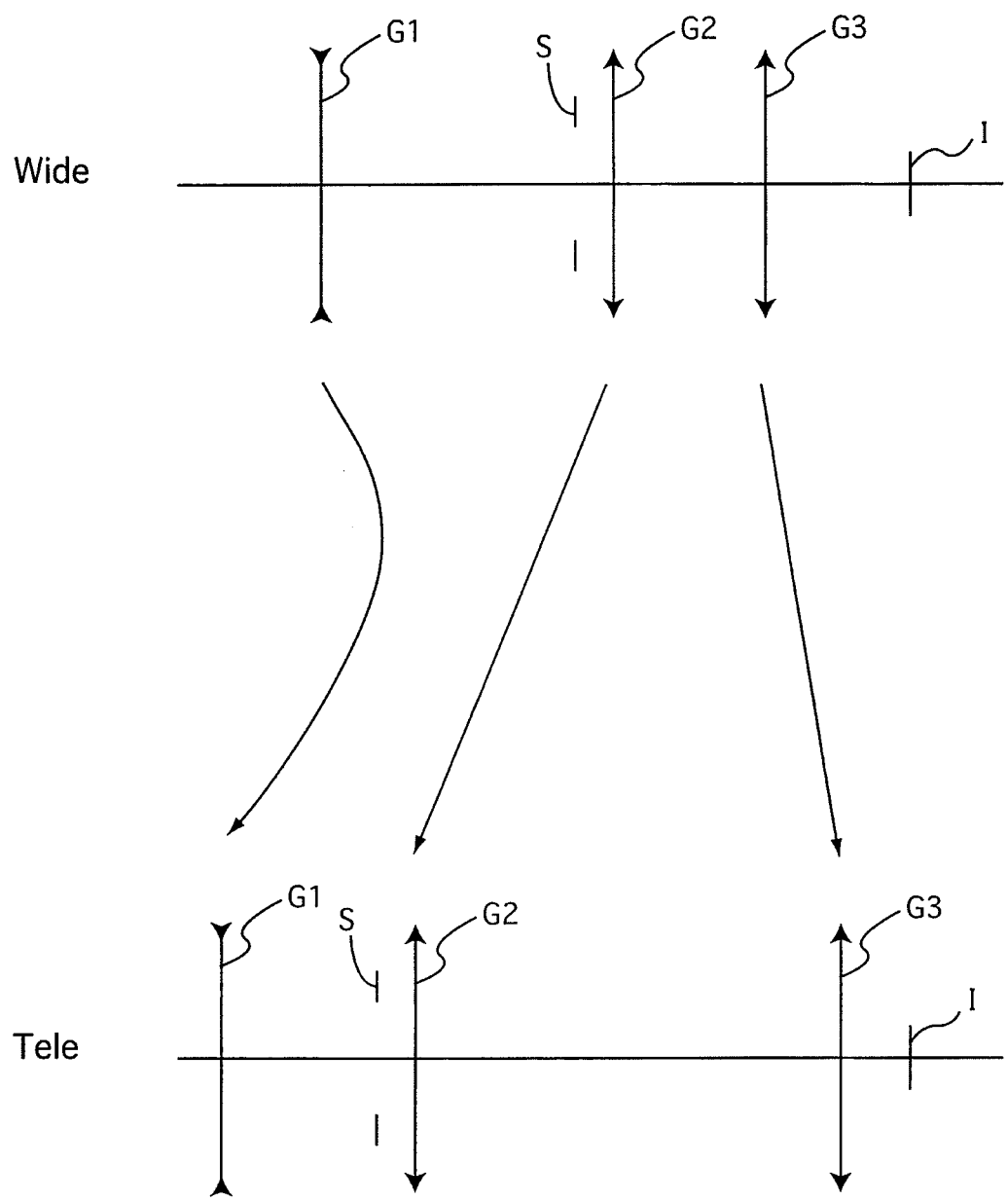
FIG. 21 shows a first zoom path of the zoom lens system according to the present invention.

The zoom lens system in the first and third through fifth numerical embodiments of the present invention, as shown in the zoom path of FIG. 21, is configured of a negative first lens group G1, a positive second lens group G2, and a positive third lens group G3, in that order from the object side. A diaphragm S which is disposed in between the first lens group G1 and the second lens group G2 moves integrally with the second lens group G2 during zooming. 'I' designates the imaging plane.

Upon zooming from the short focal length extremity (WIDE) to the long focal length extremity (TELE), each of the first through third lens groups G1 through G3 are moved along the optical axis direction so that the distance between the first lens group G1 and the second lens group G2 decreases, and the distance between the second lens group G2 and the third lens group G3 increases.

More specifically, upon zooming from the short focal length extremity to the long focal length extremity, the first lens group G1 first moves toward the image side and thereafter moves toward the object side past the short focal length extremity position (so as to move toward the object side overall), the second lens group G2 moves monotonically toward the object side, and the third lens group G3 moves monotonically toward the image side. The third lens group G3 can alternatively first move toward the object side and thereafter move toward the image side.

Figure 22:
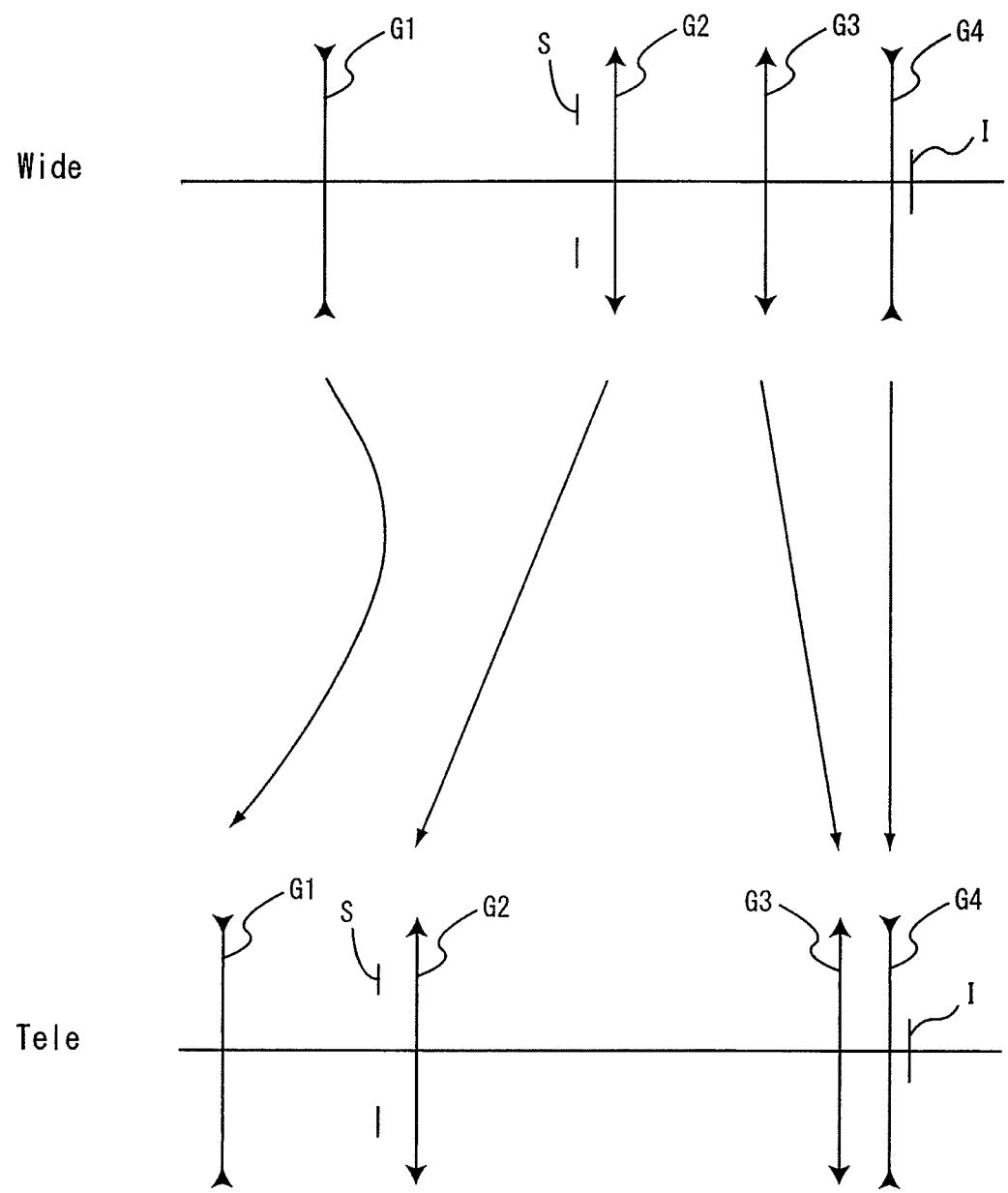
FIG. 22 shows a second zoom path of the zoom lens system according to the present invention.

The zoom lens system in the second numerical embodiment of the present invention, as shown in the zoom path of FIG. 22, is configured of a negative lens group G1, a positive second lens group G2, a positive third lens group G3 and a negative fourth lens group G4, in that order from the object side. A diaphragm S which is disposed in between the first lens group G1 and the second lens group G2 moves integrally with the second lens group G2 during zooming. 'I' designates the imaging plane.

Upon zooming from the short focal length extremity (WIDE) to the long focal length extremity (TELE), each of the first through third lens groups G1 through G3 are moved along the optical axis direction so that the distance between the first lens group G1 and the second lens group G2 decreases, the distance between the second lens group G2 and the third lens group G3 increases, and the distance between the third lens group G3 and the fourth lens group G4 decreases.

More specifically, upon zooming from the short focal length extremity to the long focal length extremity, the first lens group G1 first moves toward the image side and thereafter moves toward the object side past the short focal length extremity position (so as to move toward the object side overall), the second lens group G2 moves monotonically toward the object side, the third lens group G3 moves monotonically toward the image side, and the fourth lens group G4 does not move in the optical axis direction (remains stationary with respect to the distance from the imaging plane I).

In each of the first through fifth numerical embodiments, the first lens group G1 is configured of a negative lens element 11, a negative lens element 12, and a positive lens element 13, in that order from the object side. The negative lens element 12 is provided with an aspherical surface on each side.

In each of the first through fifth numerical embodiments, the second lens group G2 is configured of a positive first sub-lens group G2A and a negative second sub-lens group G2B, in that order from the object side.

The first sub-lens group G2A is configured of a positive lens element 21, a cemented lens having a positive lens element 22 and a negative lens element 23; and a positive lens element 24, in that order from the object side. The positive lens element 21 has an aspherical surface on each side thereof.

The second sub-lens group G2B is configured of a negative single lens element 25.

The third lens group G3 is configured of a positive single lens element 31. The positive lens element 31 has an aspherical surface on each side thereof.

The second sub-lens group G2B (negative single lens element 25) and the third lens group G3 (positive single lens element 31) constitute focusing lens groups that are moved during a focusing operation. In the illustrated embodiments, upon focusing on an object at infinity to an object at a finite distance, in at least part of the zooming range (focal length range), the second sub-lens group G2B (negative single lens element 25) is moved toward the object side or the image side and the third lens group G3 (positive single lens element 31) is moved toward the object side (i.e., each of the second sub-lens group G2B and the third lens group G3 serves as a focusing lens group).

More specifically, in the first and fifth numerical embodiments, throughout the entire zooming range (focal length range), the second sub-lens group G2B (negative single lens element 25) is moved toward the object side or the image side and the third lens group G3 (positive single lens element 31) is moved toward the object side during a focusing operation. In the second and fourth numerical embodiments, a zooming range (focal length range) exists in which only the third lens group G3 (positive single lens element 31) is moved toward the object side during a focusing operation, and a zooming range (focal length range) exists in which the second sub-lens group G2B (negative single lens element 25) is moved toward the image side and the third lens group G3 (positive single lens element 31) is moved toward the object side during a focusing operation. In the third numerical embodiment, a zooming range (focal length range) exists in which only the second sub-lens group G2B (negative single lens element 25) is moved toward the image side during a focusing operation, a zooming range (focal length range) exists in which only the third lens group G3 (positive single lens element 31) is moved toward the object side during a focusing operation, and a zooming range (focal length range) exists in which the second sub-lens group G2B (negative single lens element 25) is moved toward the image side and the third lens group G3 (positive single lens element 31) is moved toward the object side during a focusing operation.

In an internal focusing zoom lens system, in a configuration in which a focusing operation is performed using only one lens group (e.g., performing a focusing operation using only the second sub-lens group G2B of the present invention), it is extremely difficult to achieve a favorable optical quality upon focusing on an object at infinity to an object at a finite distance over the entire zooming range from the short focal length extremity to the long focal length extremity, and enlargement of the zoom lens system is unavoidable if this is nevertheless achieved. Furthermore, the amount of movement of the focusing lens group differs depending on the zooming range, and if the amount of movement of the focusing lens group is large within the zooming range at the short focal length extremity and the long focal length extremity in which the lens groups closely approach each other, miniaturization of the zoom lens system is hindered.

To solve this problem, the zoom lens system according to the first and fifth numerical embodiments achieves a favorable optical quality when focused at a close distance over the entire zooming range, miniaturization of the zoom lens system, a wide angle-of-view, a high zoom ratio, and compatibility with a large image sensor in which, throughout the entire zooming range, each of the second sub-lens group G2B and the third lens group G3 is moved along the optical axis to perform a focusing operation, and also by optimizing the ratios of the movement of the focusing lens groups (the second sub-lens group G2B and the third lens group G3) for each zooming step.

Alternatively, the zoom lens system according to the second and fourth numerical embodiments achieves a favorable optical quality when focused at a close distance over the entire zooming range, miniaturization of the zoom lens system, a wide angle-of-view, a high zoom ratio, and compatibility with a large image sensor by switching between a zooming range in which only the third lens group G3 is moved to perform a focusing operation and a zooming range in which each of the second sub-lens group G2B and the third lens group G3 is moved along the optical axis to perform a focusing operation, and also by optimizing the ratios of the movement of the focusing lens groups (the second sub-lens group G2B and the third lens group G3) for each zooming step.

Alternatively, the zoom lens system according to the third numerical embodiment achieves a favorable optical quality when focused at a close distance over the entire zooming range, miniaturization of the zoom lens system, a wide angle-of-view, a high zoom ratio, and compatibility with a large image sensor by switching between a zooming range in which only the second sub-lens group G2B is moved to perform a focusing operation, a zooming range in which only the third lens group G3 is moved to perform a focusing operation, and a zooming range in which each of the second sub-lens group G2B and the third lens group G3 is moved along the optical axis to perform a focusing operation, and also by optimizing the ratios of the movement of the focusing lens groups (the second sub-lens group G2B and the third lens group G3) for each zooming step.

More specifically, at the short focal length extremity, the focusing movement amount of the second sub-lens group G2B along the optical axis direction is set shorter than the focusing movement amount of the third lens group G3 along the optical axis direction with respect to the same object distance, and the movement-amount ratio is specified by condition (1). By satisfying condition (1), the third lens group G3 mainly carries out the focusing operation at the short focal length extremity, a favorable optical quality can be achieved even when focused at a close distance, and the amount of movement of the second sub-lens group G2B during focusing can be reduced at the short focal length extremity so that further miniaturization is possible.

Note that "focusing movement amount" refers to the distance of movement of the focusing lens group when the focusing lens group is moved to from a state of being focused on an object at infinity to a state of being focused on an object at an arbitrary finite distance.

If the upper limit of condition (1) is exceeded, the focusing movement amount of the second sub-lens group G2B having a negative focusing-sensitivity with respect to the focusing movement amount of the third lens group G3 having a positive focusing sensitivity becomes too large in the same direction at the short focal length extremity, so that the optical quality deteriorates when focused at a close distance, and it becomes difficult to miniaturize the zoom lens system.

If the lower limit of condition (1) is exceeded, the focusing movement amount of the second sub-lens group G2B becomes too large in the opposite direction with respect to the focusing movement amount of the third lens group G3 at the short focal length extremity, so that the optical quality likewise deteriorates when focused at a close distance.

Condition (2) specifies a condition that the focusing movement-amount ratio of the second sub-lens group G2B to the third lens group G3 (with respect to the same object distance) should always satisfy when the focusing movement-amount ratio thereof changes in accordance with a change in focal length during zooming from an intermediate focal length to the long focal length extremity. By satisfying condition (2), an optimum balance between the focusing movement amount of the second sub-lens group G2B and the focusing movement amount of the third lens group G3 can be attained, so that a favorable optical quality can be achieved even when focused at a close distance, and the zoom lens system can be miniaturized.

If the upper limit of condition (2) is exceeded, since the second sub-lens group G2B and the third lens group G3, which have opposite focusing sensitivities, move in the same direction during a focusing operation within a zooming range from an intermediate focal length to the long focal length extremity, this causes an increase in the focusing movement amount of the third lens group G3, so that the optical quality deteriorates when focused at a close distance.

If the lower limit of condition (2) is exceeded, the focusing movement amount of the third lens group G3 with respect to the focusing movement amount of the second sub-lens group G2B becomes too large in the opposite direction within a zooming range from an intermediate focal length to the long focal length extremity, so that the optical quality deteriorates when focused at a close distance.

If only the third lens group G3 mainly carries out focusing in a zooming range from an intermediate focal length fm ($fm=(fw*ft)^{1/2}$, wherein fw designates the focal length of the entire zoom lens system at the short focal length extremity, and ft designates the focal length of the entire zoom lens system at the long focal length extremity) to the long focal length extremity, the optical quality deteriorates at short focusing distances while the focusing movement amount of the third lens group G3 becomes too large, so that the zoom lens system cannot be miniaturized. In order to solve this problem, it is desirable for both of the second sub-lens group G2B and the third lens group G3 to carry out focusing within the zooming range from the intermediate focal length to the long focal length extremity.

Furthermore, by altering the ratio of the focusing movement amounts of the second sub-lens group G2B and the third lens group G3 in accordance with the object distance, the optical quality can be improved even when focused at a close distance.

Condition (3) specifies the ratio of the focal length of the second lens group G2 to the focal length of the second sub-lens group G2B. By satisfying condition (3), an appropriate refractive power for the second sub-lens group (focusing lens group) G2B can be attained, the fluctuation of aberrations during focusing can be suppressed, and the mechanical load on the focusing mechanism can be reduced.

If the upper limit of condition (3) is exceeded, the refractive power of the second sub-lens group (focusing lens group) G2B becomes too weak, so that the amount of movement of the second sub-lens group G2B during a focusing operation increases, so that the optical system (zoom lens system) which includes the focusing mechanism increases in size.

If the lower limit of condition (3) is exceeded, the refractive power of the second sub-lens group (focusing lens group) G2B becomes too strong, so that although the amount of movement of the second sub-lens group G2B during a focusing operation can be reduced, the fluctuation in optical quality upon focusing on an object at infinity to an object at a finite distance becomes large.

As mentioned above, in each of the first through fifth numerical embodiments, the second sub-lens group G2B is configured of a negative single lens element 25. According to this configuration, it is possible to achieve further miniaturization and reduction of weight of the second sub-lens group G2B, which constitutes a focusing lens group.

Condition (4) specifies the shape factor (the ratio of the radius of curvature of the surface on the object side to the radius of curvature of the surface on the image side) of the negative single lens element 25 in the case where the second sub-lens group G2B is configured of the negative single lens element 25. By satisfying condition (4), fluctuation of the optical quality when focused at a close distance can be reduced.

If the upper limit of condition (4) is exceeded, the curvatures of the surface on the object side and the surface on the image side of the negative single lens element 25 become close (similar) to each other, so that the refractive power of the negative single lens element 25 becomes weak, which results in a large amount of movement of the negative single lens element 25 during a focusing operation.

If the lower limit of condition (4) is exceeded, the curvature of the surface on the object side of the negative single lens element 25, which constitutes a focusing lens group, becomes too great (i.e., the radius of curvature becomes too small), so that a large amount of aberration fluctuations occur during focusing at various object distances.

Condition (5) specifies the Abbe number with respect to the d-line of the negative single lens element 25 in the case where the second sub-lens group G2B is configured of the negative single lens element 25. By satisfying condition (5), aberration fluctuations upon focusing on an object at infinity through to an object at a finite distance can be suppressed.

If the lower limit of condition (5) is exceeded, lateral chromatic aberration fluctuations during focusing increase.

Condition (6) specifies the ratio of the distance along the optical axis between the surface of the second sub-lens group G2B that is closest to the object side and the surface of the second sub-lens group G2B that is closest to the image side (i.e., the thickness of the second sub-lens group G2B along the optical axis direction) to the distance along the optical axis between the surface of the second lens group G2 that is closest to the object side and the surface of the second lens group G2 that is closest to the image side (i.e., the thickness of the second lens group G2 along the optical axis direction). By satisfying condition (6), the weight of the second sub-lens group G2B, which constitutes a focusing lens group, can be reduced.

If the upper limit of condition (6) is exceeded, the weight-reduction of the second sub-lens group G2B, which constitutes a focusing lens group, becomes insufficient, and increasing the burden on the focusing mechanism.

Condition (7) specifies the change in the lateral magnification of the third lens group G3 upon zooming from the short focal length extremity to the long focal length extremity. By satisfying condition (7), miniaturization of the zoom lens system and a high zoom ratio can both be achieved.

If the upper limit of condition (7) is exceeded, although advantageous in regard to achieving a high zoom ratio, the change in the lens exit angle (from the third lens group G3) during zooming increases.

If the lower limit of condition (7) is exceeded, since the zooming function of the third lens group G3 decreases, the zooming burden on the second lens group G2 increases, so that the zoom lens system cannot be sufficiently miniaturized.

As described above, as shown in each of the first through fifth numerical embodiments, in the zoom lens system of the present invention, the first sub-lens group G2A is configured of four lens elements, i.e., a positive lens element 21, a positive lens element 22, a negative lens element 23 and a positive lens element 24, in that order from the object side. Accordingly, in a negative-lead lens system like that of the present invention, abaxial coma flare can be reduced over the entire zooming range.

As described above, in each of the first through fifth numerical embodiments of the zoom lens system according to the present invention, the first lens group G1 is configured of three lens elements, i.e., a negative lens element 11, a negative lens element 12 having an aspherical surface on each side thereof, and a positive lens element 13. The negative lens element 12 can alternatively only have one aspherical surface. Accordingly, by providing the lens element 12, having at least one aspherical surface, within the first lens group G1, the angle-of-view can be widened, the aperture diameter can be enlarged, and astigmatism and distortion at the short focal length extremity can be reduced.

Condition (8) specifies the ratio of the focal length of the first lens group G1 to the focal length of the (aspherical) lens element 12 that is provided in the first lens group G1, in the case where the first lens group G1 is configured of the negative lens element 11, the negative lens element 12 having an aspherical surface on at least one side thereof, and a positive lens element 13, in that order from the object side. By satisfying condition (8), a zoom lens system that exhibits minimal deterioration in optical quality during temperature changes can be achieved at a low cost.

If the upper limit of condition (8) is exceeded, the negative refractive power of the negative lens element 12 becomes too strong, so that deterioration in the optical quality increases upon a temperature change.

If the lower limit of condition (8) is exceeded, since the lens element 12 acquires a positive refractive power, the negative refractive power of the negative lens element 11 needs to become excessively strong, so that a large amount of aberrations at the abaxial light rays occur, especially at the short focal length extremity.

As described above, in each of the first through fifth numerical embodiments, the third lens group (focusing lens group) G3 is configured of a positive single lens element 31.

Condition (9) specifies the specific gravity of the third lens element 31 when the third lens group G3 is configured of the positive single lens element 31. By using the positive single lens element 31 having a weight that satisfies condition (9), further miniaturization and reduction in weight of the third lens group (focusing lens group) G3 can be achieved.

If the upper limit of condition (9) is exceeded, miniaturization and reduction in weight of the third lens group (focusing lens group) G3 become insufficient.

[Embodiments]

Specific numerical embodiments will be herein discussed. In the aberration diagrams and the tables, the d-line, g-line and C-line show aberrations at their respective wave-lengths; S designates the sagittal image, designates the meridional image, Fno. designates the f-number, designates the focal length of the entire optical system, W designates the half angle of view (°), designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The units for the various lengths defined herein are in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

[Numerical Embodiment 1]

Figure 1:
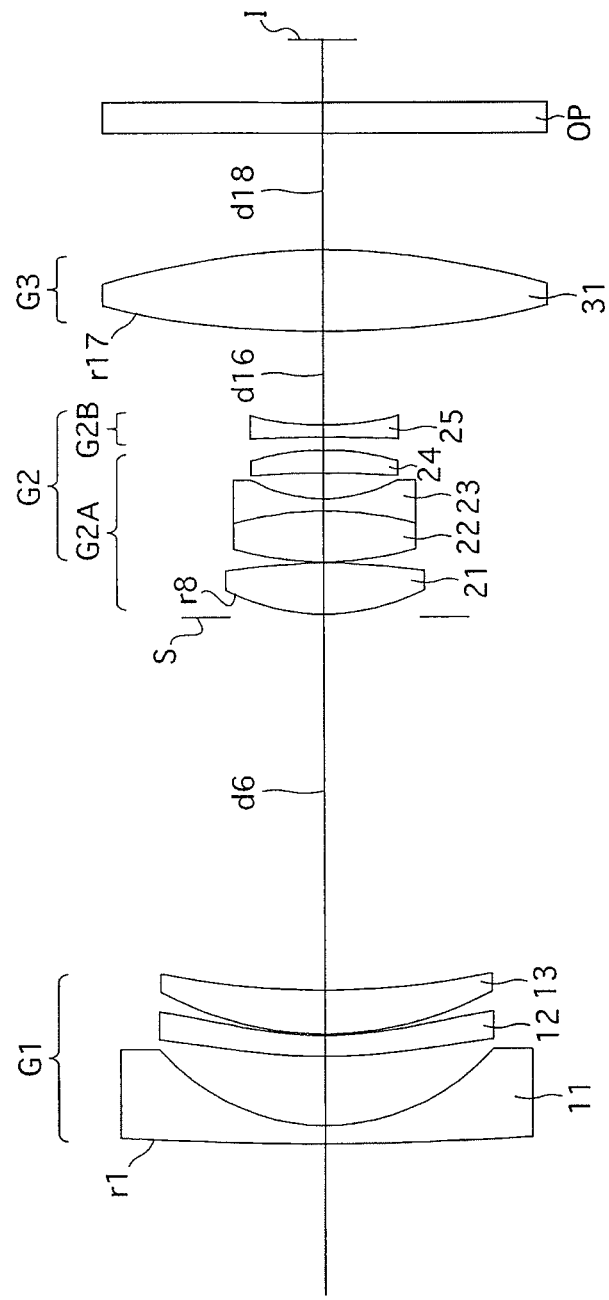
FIG. 1 shows a lens arrangement of a first numerical embodiment of a zoom lens system, according to the present invention, at the short focal length extremity when focused on an object at infinity.

FIGS. 1 through 4D and Tables 1 through 6 show a first numerical embodiment according to the present invention. FIG. 1 shows a lens arrangement of the first numerical embodiment when focused on an object at infinity at the short focal length extremity. FIGS. 2A, 2B, 2C and 2D show various aberrations that occurred in the lens arrangement shown in FIG. 1 at the short focal length extremity when focused on an object at infinity. FIGS. 3A, 3B, 3C and 3D show various aberrations that occurred in the lens arrangement shown in FIG. 1 at an intermediate focal length when focused on an object at infinity. FIGS. 4A, 4B, 4C and 4D show various aberrations that occurred in the lens arrangement shown in FIG. 1 at the long focal length extremity when focused on an object at infinity. Table 1 shows the lens surface data, Table 2 shows various zoom lens system data, Table 0.3 shows the aspherical surface data, Table 4 shows the lens group data of the zoom lens system, Table 5 shows data of the variable distances between each lens group at various object distances, and Table 6 shows the focusing movement amounts of each lens group at various object distances, according to the first numerical embodiment.

The zoom lens system of the first numerical embodiment is configured of a negative first lens group G1, a positive second lens group G2, and a positive third lens group G3, in that order from the object side. An optical filter OP is provided behind the third lens group G3 (and in front of the imaging plane I).

The first lens group G1 (surface Nos. 1 through 6) is configured of a negative meniscus lens element 11 having a convex surface on the object side, a negative meniscus lens element 12 having a convex surface on the object side, and a positive meniscus lens element 13 having a convex surface on the object side, in that order from the object side. The negative meniscus lens element 12 has an aspherical surface on each side thereof.

The second lens group G2 (surface Nos. 8 through 16) is configured of a positive first sub-lens group G2A (surface Nos. 8 through 14) and a negative second sub-lens group G2B (surface Nos. 15 and 16), in that order from the object side.

The first sub-lens group G2A is configured of a positive biconvex lens element 21, a cemented lens having a positive biconvex lens element 22 and a negative biconcave lens element 23, and a positive meniscus lens element 24 having a convex surface on the image side, in that order from the object side. The positive biconvex lens element 21 has an aspherical surface on each side thereof.

The second sub-lens group G2B is configured of a single negative biconcave lens element 25.

The diaphragm S (surface No. 7), which is disposed in between the first lens group G1 and the second lens group G2, moves integrally with the second lens group G2 during zooming.

The third lens group G3 (surface Nos. 17 and 18) is configured of a positive single biconvex lens element 31. The positive single biconvex lens element 31 has an aspherical surface on each side.

The optical filter OP (surface Nos. 19 and 20) which is provided behind third lens group (the positive single biconvex lens element 31) G3 (and in front of the imaging plane I) is a flat parallel plate which replaces, and is optically equivalent to, a filter group having a low-pass filter and an infrared cut filter, etc., and the cover glass of the image sensor (not shown).

TABLE 1

SURFACE DATA

| Surf. No. | r | d | Nd | vd |
|---|---|---|---|---|
| 1 | 225.037 | 1.200 | 1.80420 | 46.5 |
| 2 | 15.089 | 4.540 | | |
| 3* | 35.777 | 1.400 | 1.54358 | 55.7 |
| 4* | 25.707 | 0.100 | | |
| 5 | 23.830 | 2.897 | 1.84666 | 23.8 |
| 6 | 56.890 | d6 | | |
| 7(Diaphragm) | ∞ | 0.200 | | |
| 8* | 14.282 | 3.400 | 1.69350 | 53.2 |
| 9* | −36.678 | 0.100 | | |
| 10 | 23.448 | 3.400 | 1.61800 | 63.4 |

TABLE 1-continued

SURFACE DATA

| Surf. No. | r | d | Nd | vd |
|---|---|---|---|---|
| 11 | −23.448 | 0.800 | 1.67270 | 32.2 |
| 12 | 10.398 | 1.732 | | |
| 13 | −65.570 | 1.516 | 1.72916 | 54.7 |
| 14 | −17.504 | 0.867 | | |
| 15 | −113.940 | 0.800 | 1.69680 | 55.5 |
| 16 | 20.598 | d16 | | |
| 17* | 104.882 | 5.377 | 1.54358 | 55.7 |
| 18* | −38.373 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 2

ZOOM LENS SYSTEM DATA
Zoom Ratio 3.30

| | Short Focal Length Extremity | Intermediate Focal Length | Long Focal Length Extremity |
|---|---|---|---|
| FNO. | 3.6 | 5.1 | 5.8 |
| f | 16.22 | 28.95 | 53.51 |
| W | 47.1 | 26.7 | 15.0 |
| Y | 14.20 | 14.20 | 14.20 |
| fB | 4.181 | 4.181 | 4.181 |
| L | 73.23 | 72.49 | 86.00 |
| d6 | 24.748 | 10.693 | 3.022 |
| d16 | 6.268 | 21.174 | 47.468 |
| d18 | 7.703 | 6.114 | 1.000 |

TABLE 3

ASPHERICAL SURFACE DATA
(the aspherical surface coefficients not indicated are zero (0.00)):

| Surf. No. | K | A4 | A6 | A8 |
|---|---|---|---|---|
| 3 | 0.000 | −0.6506E−04 | 0.2633E−06 | −0.6673E−09 |
| 4 | 0.000 | −0.8622E−04 | 0.3361E−06 | −0.1316E−08 |
| 8 | −1.654 | 0.2252E−04 | 0.7673E−07 | |
| 9 | 0.000 | 0.5473E−04 | −0.5955E−07 | |
| 17 | 0.000 | 0.1953E−04 | −0.5202E−07 | 0.7721E−10 |
| 18 | 0.000 | 0.3153E−04 | −0.1037E−06 | 0.1448E−09 |

TABLE 4

LENS GROUP DATA

| Lens Group | 1st Surf. | Focal Length |
|---|---|---|
| 1 | 1 | −31.43 |
| 2 | 8 | 23.87 |
| (2A | 8 | 16.372) |
| (2B | 15 | −24.974) |
| 3 | 17 | 52.38 |

TABLE 5

DATA OF VARIABLE DISTANCES BETWEEN LENS GROUPS

| | Short Focal Length Extremity | Intermediate Focal Length | Long Focal Length Extremity |
|---|---|---|---|
| Object Dist. | Infinity | Infinity | Infinity |
| d6 | 24.748 | 10.693 | 3.022 |
| d14 | 0.867 | 0.867 | 0.867 |
| d16 | 6.268 | 21.174 | 47.468 |
| d18 | 7.703 | 6.114 | 1.000 |
| Object Dist. | 3 m | 3 m | 3 m |
| d6 | 24.748 | 10.693 | 3.022 |
| d14 | 0.858 | 0.917 | 0.953 |
| d16 | 6.056 | 20.871 | 46.309 |
| d18 | 7.924 | 6.367 | 2.073 |
| Object Dist. | 1 m | 1 m | 1 m |
| d6 | 24.748 | 10.693 | 3.022 |
| d14 | 0.841 | 1.017 | 1.113 |
| d16 | 5.648 | 20.274 | 44.152 |
| d18 | 8.349 | 6.864 | 4.070 |
| Object Dist. | 0.5 m | 0.5 m | 0.5 m |
| d6 | 24.748 | 10.693 | 3.022 |
| d14 | 0.817 | 1.161 | 1.328 |
| d16 | 5.072 | 19.406 | 41.243 |
| d18 | 8.949 | 7.588 | 6.764 |
| Object Dist. | 0.15 m | 0.2 m | 0.3 m |
| d6 | 24.748 | 10.693 | 3.022 |
| d14 | 0.723 | 1.568 | 1.581 |
| d16 | 2.806 | 16.967 | 37.829 |
| d18 | 11.309 | 9.620 | 9.925 |

TABLE 6

FOCUSING MOVEMENT AMOUNTS OF EACH LENS GROUP
(movement toward the image side is positive;
movement toward the object side is negative)

| | Short Focal Length Extremity | Intermediate Focal Length | Long Focal Length Extremity |
|---|---|---|---|
| Object Dist. | 3 m | 3 m | 3 m |
| 1st Lens Group | 0.000 | 0.000 | 0.000 |
| 1st Sub-lens Group | 0.000 | 0.000 | 0.000 |
| 2nd Sub-lens Group | −0.009 | 0.050 | 0.086 |
| 3rd Lens Group | −0.221 | −0.253 | −1.073 |
| Object Dist. | 1 m | 1 m | 1 m |
| 1st Lens Group | 0.000 | 0.000 | 0.000 |
| 1st Sub-lens Group | 0.000 | 0.000 | 0.000 |
| 2nd Sub-lens Group | −0.026 | 0.150 | 0.246 |
| 3rd Lens Group | −0.646 | −0.750 | −3.070 |
| Object Dist. | 0.5 m | 0.5 m | 0.5 m |
| 1st Lens Group | 0.000 | 0.000 | 0.000 |
| 1st Sub-lens Group | 0.000 | 0.000 | 0.000 |
| 2nd Sub-lens Group | −0.050 | 0.294 | 0.461 |
| 3rd Lens Group | −1.246 | −1.474 | −5.764 |
| Object Dist. | 0.15 m | 0.2 m | 0.3 m |
| 1st Lens Group | 0.000 | 0.000 | 0.000 |
| 1st Sub-lens Group | 0.000 | 0.000 | 0.000 |
| 2nd Sub-lens Group | −0.144 | 0.701 | 0.714 |
| 3rd Lens Group | −3.606 | −3.506 | −8.925 |

[Numerical Embodiment 2]

Figure 5:
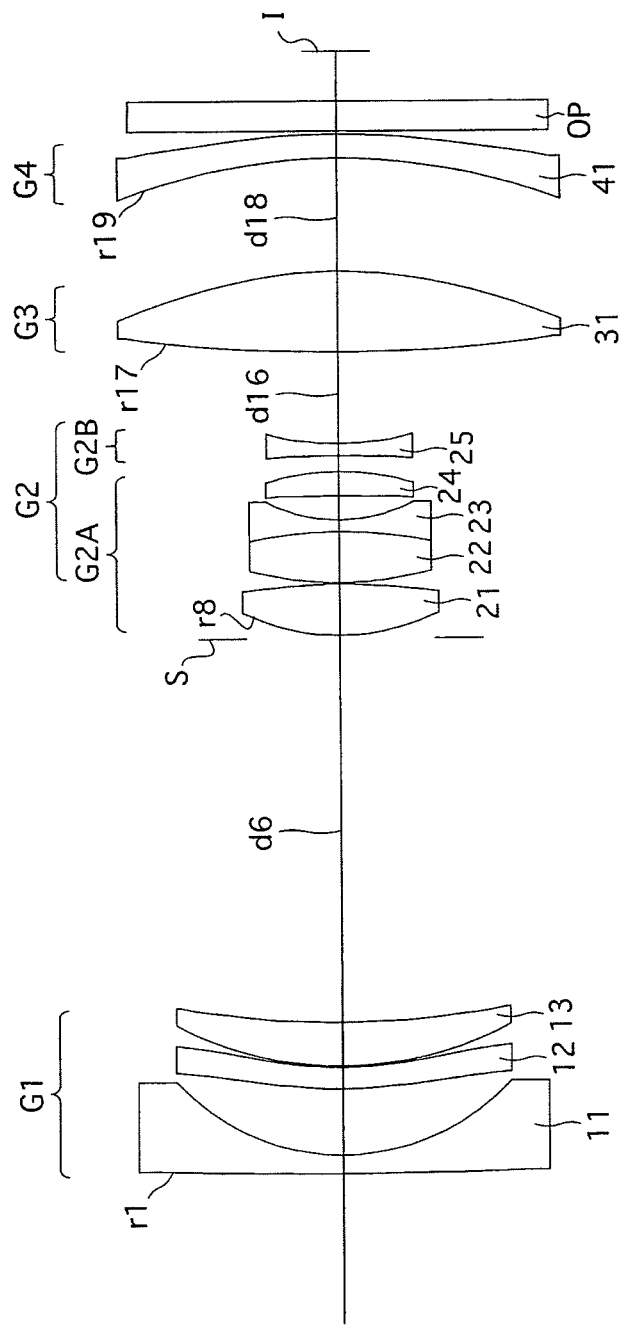
FIG. 5 shows a lens arrangement of a second numerical embodiment of a zoom lens system, according to the present invention, at the short focal length extremity when focused on an object at infinity.
Figure 8A:
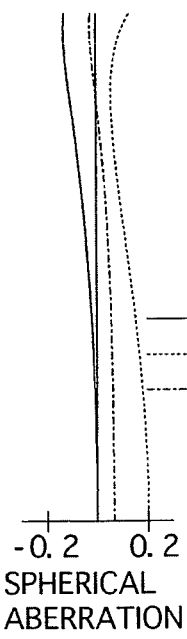
FIGS. 8A, 8B, 8C and 8D show various aberrations that occurred in the lens arrangement of FIG. 5, at the long focal length extremity.
Figure 8B:
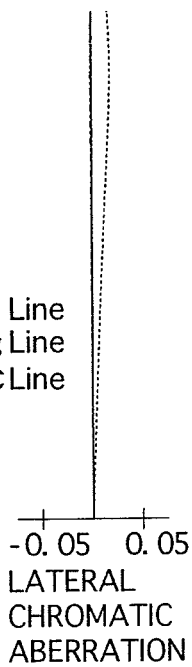
Figure 8C:
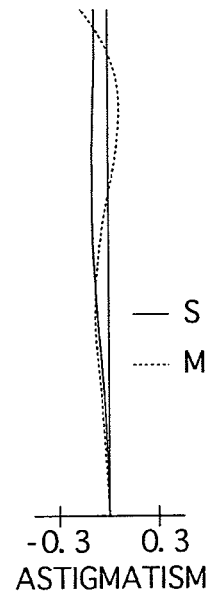
Figure 8D:
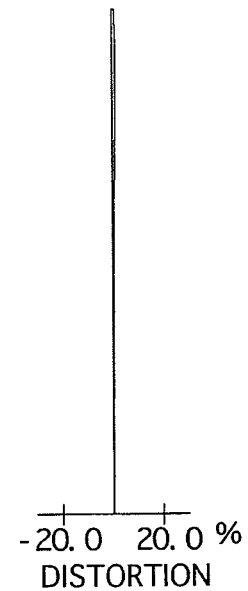

FIGS. 5 through 8D and Tables 7 through 12 show a second numerical embodiment according to the present invention. FIG. 5 shows a lens arrangement of the second numerical embodiment when focused on an object at infinity at the short focal length extremity. FIGS. 6A, 6B, 6C and 6D show various aberrations that occurred in the lens arrangement shown in FIG. 5 at the short focal length extremity when focused on an object at infinity. FIGS. 7A, 7B, 7C and 7D show various aberrations that occurred in the lens arrangement shown in FIG. 5 at an intermediate focal length when focused on an object at infinity. FIGS. 8A, 8B, 8C and 8D show various aberrations that occurred in the lens arrangement shown in FIG. 5 at the long focal length extremity when focused on an object at infinity. Table 7 shows the lens surface data, Table 8 shows various zoom lens system data, Table 9 shows the aspherical surface data, Table 10 shows the lens group data of the zoom lens system, Table 11 shows data of the variable distances between each lens group at various object distances, and Table 12 shows the focusing movement amounts of each lens group at various object distances, according to the second numerical embodiment.

The lens arrangement of the second numerical embodiment is the same as that of the first numerical embodiment except that a fourth lens group G4 (surface Nos. 19 and 20), which is stationary with respect to the optical axis direction, is disposed in between the third lens group G3 and the imaging plane I (i.e., the distance between the fourth lens group and the imaging plane remains constant). The fourth lens group G4 is configured of a single negative meniscus lens element 41 having a convex surface on the image side. The negative meniscus lens element 41 has an aspherical surface on the image side thereof.

TABLE 7

SURFACE DATA

| Surf. No. | r | d | Nd | vd |
|---|---|---|---|---|
| 1 | 500.000 | 1.200 | 1.80420 | 46.5 |
| 2 | 15.720 | 4.371 | | |
| 3* | 32.168 | 1.400 | 1.54358 | 55.7 |
| 4* | 24.400 | 0.100 | | |
| 5 | 24.846 | 2.908 | 1.84666 | 23.8 |
| 6 | 62.170 | d6 | | |
| 7(Diaphragm) | ∞ | 0.200 | | |
| 8* | 14.679 | 3.400 | 1.69350 | 53.2 |
| 9* | −39.498 | 0.100 | | |
| 10 | 23.683 | 3.400 | 1.61800 | 63.4 |
| 11 | −30.733 | 0.800 | 1.68893 | 31.2 |
| 12 | 11.070 | 1.604 | | |
| 13 | −131.215 | 1.618 | 1.72916 | 54.7 |
| 14 | −17.776 | 1.065 | | |
| 15 | −87.264 | 0.800 | 1.69680 | 55.5 |
| 16 | 19.468 | d16 | | |
| 17* | 178.487 | 5.357 | 1.54358 | 55.7 |
| 18* | −30.729 | d18 | | |
| 19 | −42.495 | 1.600 | 1.54358 | 55.7 |
| 20* | −53.879 | 0.200 | | |
| 21 | ∞ | 2.000 | 1.51680 | 64.2 |
| 22 | ∞ | — | | |

The asterisk (*) designates an aspherical surface which is rotationally symmetrical with respect to the optical axis.

TABLE 8

ZOOM LENS SYSTEM DATA
Zoom Ratio 3.30

| | Short Focal Length Extremity | Intermediate Focal Length | Long Focal Length Extremity |
|---|---|---|---|
| FNO. | 3.6 | 5.0 | 5.8 |
| f | 16.22 | 28.69 | 53.51 |
| W | 47.1 | 26.4 | 14.8 |
| Y | 14.20 | 14.20 | 14.20 |
| fB | 3.182 | 3.182 | 3.182 |
| L | 74.42 | 72.89 | 86.00 |
| d6 | 25.520 | 11.262 | 2.949 |
| d16 | 6.112 | 20.345 | 45.748 |
| d18 | 7.483 | 5.977 | 2.000 |

TABLE 9

Aspherical Surface Data (the aspherical surface coefficients not indicated are zero (0.00)):

| Surf. No. | K | A4 | A6 | A8 |
|---|---|---|---|---|
| 3 | 0.000 | −0.8077E−04 | 0.2678E−06 | −0.6677E−09 |
| 4 | 0.000 | −0.1013E−03 | 0.3274E−06 | −0.1139E−08 |
| 8 | −1.495 | 0.1843E−04 | 0.1034E−06 | |
| 9 | 0.000 | 0.5859E−04 | −0.4389E−07 | |
| 17 | 0.000 | 0.1899E−04 | −0.9932E−07 | 0.2394E−09 |
| 18 | 0.000 | 0.3258E−04 | −0.1799E−06 | 0.4226E−09 |
| 20 | 0.000 | 0.8034E−06 | 0.1338E−06 | −0.4239E−09 |

TABLE 10

LENS GROUP DATA

| Lens Group | $1^{st}$ Surf. | Focal Length |
|---|---|---|
| 1 | 1 | −31.84 |
| 2 | 8 | 23.92 |
| (2A | 8 | 15.905) |
| (2B | 15 | −22.773) |
| 3 | 17 | 48.67 |
| 4 | 19 | −389.27 |

TABLE 11

DATA OF VARIABLE DISTANCES BETWEEN LENS GROUPS

| | Short Focal Length Extremity | Intermediate Focal Length | Long Focal Length Extremity |
|---|---|---|---|
| Object Dist. | Infinity | Infinity | Infinity |
| d6 | 25.520 | 11.262 | 2.949 |
| d14 | 1.065 | 1.065 | 1.065 |
| d16 | 6.112 | 20.345 | 45.748 |
| d18 | 7.483 | 5.977 | 2.000 |
| Object Dist. | 3 m | 3 m | 3 m |
| d6 | 25.520 | 11.262 | 2.949 |
| d14 | 1.065 | 1.103 | 1.113 |
| d16 | 5.939 | 20.043 | 44.168 |
| d18 | 7.656 | 6.241 | 3.532 |
| Object Dist. | 1 m | 1 m | 1 m |
| d6 | 25.520 | 11.262 | 2.949 |
| d14 | 1.065 | 1.182 | 1.199 |
| d16 | 5.606 | 19.449 | 41.552 |
| d18 | 7.989 | 6.756 | 6.062 |
| Object Dist. | 0.5 m | 0.5 m | 0.5 m |
| d6 | 25.520 | 11.262 | 2.949 |
| d14 | 1.065 | 1.294 | 1.319 |
| d16 | 5.130 | 18.591 | 38.457 |
| d18 | 8.465 | 7.502 | 9.037 |
| Object Dist. | 0.15 m | 0.2 m | 0.3 m |
| d6 | 25.520 | 11.262 | 2.949 |
| d14 | 1.065 | 1.603 | 1.485 |
| d16 | 3.215 | 16.218 | 35.265 |
| d18 | 10.380 | 9.566 | 12.063 |

TABLE 12

FOCUSING MOVEMENT AMOUNTS OF EACH LENS GROUP
(movement toward the image side is positive;
movement toward the object side is negative)

| | Short Focal Length Extremity | Intermediate Focal Length | Long Focal Length Extremity |
|---|---|---|---|
| Object Dist. | 3 m | 3 m | 3 m |
| $1^{st}$ Lens Group | 0.000 | 0.000 | 0.000 |
| $1^{st}$ Sub-lens Group | 0.000 | 0.000 | 0.000 |
| $2^{nd}$ Sub-lens Group | 0.000 | 0.038 | 0.048 |

TABLE 12-continued

FOCUSING MOVEMENT AMOUNTS OF EACH LENS GROUP
(movement toward the image side is positive;
movement toward the object side is negative)

| | Short Focal Length Extremity | Intermediate Focal Length | Long Focal Length Extremity |
|---|---|---|---|
| $3^{rd}$ Lens Group | −0.173 | −0.264 | −1.532 |
| Object Dist. | 1 m | 1 m | 1 m |
| $1^{st}$ Lens Group | 0.000 | 0.000 | 0.000 |
| $1^{st}$ Sub-lens Group | 0.000 | 0.000 | 0.000 |
| $2^{nd}$ Sub-lens Group | 0.000 | 0.117 | 0.134 |
| $3^{rd}$ Lens Group | −0.506 | −0.779 | −4.062 |
| Object Dist. | 0.5 m | 0.5 m | 0.5 m |
| $1^{st}$ Lens Group | 0.000 | 0.000 | 0.000 |
| $1^{st}$ Sub-lens Group | 0.000 | 0.000 | 0.000 |
| $2^{nd}$ Sub-lens Group | 0.000 | 0.229 | 0.254 |
| $3^{rd}$ Lens Group | −0.982 | −1.525 | −7.037 |
| Object Dist. | 0.15 m | 0.2 m | 0.3 m |
| $1^{st}$ Lens Group | 0.000 | 0.000 | 0.000 |
| $1^{st}$ Sub-lens Group | 0.000 | 0.000 | 0.000 |
| $2^{nd}$ Sub-lens Group | 0.000 | 0.538 | 0.420 |
| $3^{rd}$ Lens Group | −2.897 | −3.589 | −10.063 |

[Numerical Embodiment 3]

Figure 9:
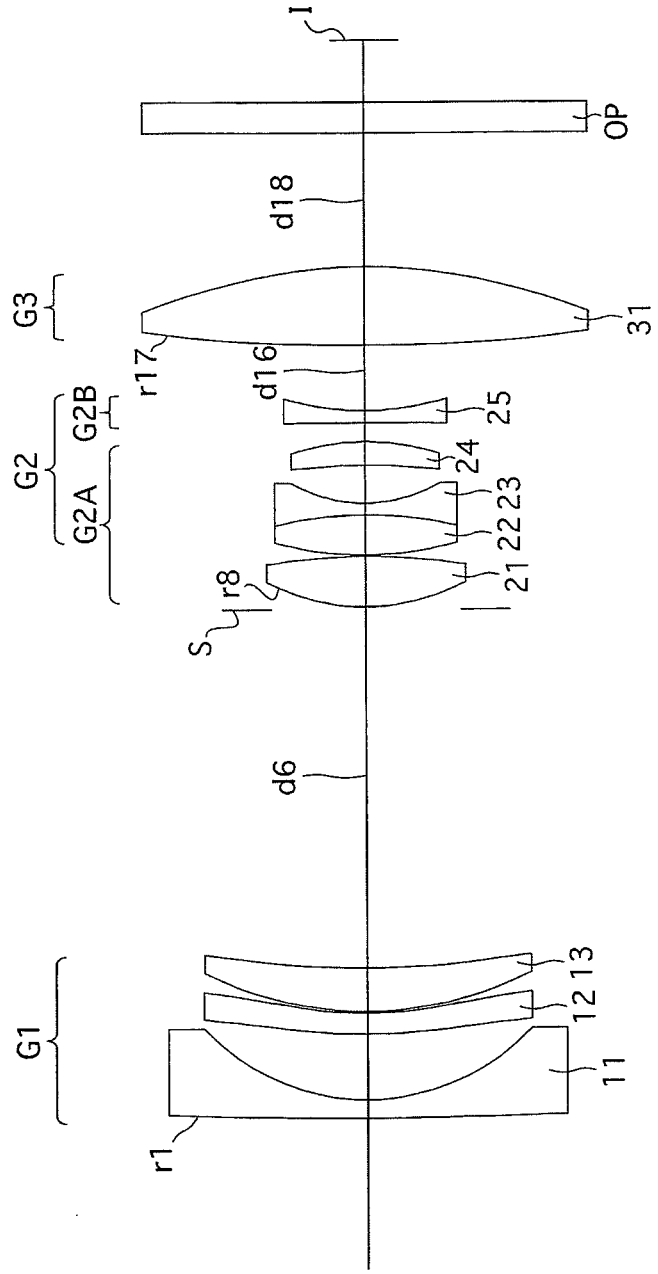
FIG. 9 shows a lens arrangement of a third numerical embodiment of a zoom lens system, according to the present invention, at the short focal length extremity when focused on an object at infinity.

FIGS. 9 through 12D and Tables 13 through 18 show a third numerical embodiment of a zoom lens system according to the present invention. FIG. 9 shows a lens arrangement of the third numerical embodiment when focused on an object at infinity at the short focal length extremity. FIGS. 10A, 10B, 10C and 10D show various aberrations that occurred in the lens arrangement shown in FIG. 9 at the short focal length extremity when focused on an object at infinity. FIGS. 11A, 11B, 11C and 11D show various aberrations that occurred in the lens arrangement shown in FIG. 9 at an intermediate focal length when focused on an object at infinity. FIGS. 12A, 12B, 12C and 12D show various aberrations that occurred in the lens arrangement shown in FIG. 9 at the long focal length extremity when focused on an object at infinity. Table 13 shows the lens surface data, Table 14 shows various zoom lens system data, Table 15 shows the aspherical surface data, Table 16 shows the lens group data of the zoom lens system, Table 17 shows data of the variable distances between each lens group at various object distances, and Table 18 shows the focusing movement amounts of each lens group at various object distances, according to the third numerical embodiment.

The lens arrangement of the third numerical embodiment is the same as that of the first numerical embodiment.

TABLE 13

SURFACE DATA

| Surf. No. | r | d | Nd | νd |
|---|---|---|---|---|
| 1 | 441.134 | 1.200 | 1.80420 | 46.5 |
| 2 | 15.334 | 4.334 | | |
| 3* | 36.506 | 1.400 | 1.54358 | 55.7 |
| 4* | 26.035 | 0.100 | | |
| 5 | 24.777 | 2.877 | 1.84666 | 23.8 |
| 6 | 66.693 | d6 | | |
| 7(Diaphragm) | ∞ | 0.200 | | |
| 8* | 13.665 | 3.378 | 1.69350 | 53.2 |
| 9* | −34.783 | 0.100 | | |
| 10 | 24.201 | 2.662 | 1.61800 | 63.4 |
| 11 | −26.411 | 0.800 | 1.67270 | 32.2 |
| 12 | 10.345 | 2.500 | | |
| 13 | −42.413 | 1.569 | 1.72916 | 54.7 |
| 14 | −16.112 | 1.266 | | |
| 15 | −331.190 | 0.800 | 1.69680 | 55.5 |
| 16 | 19.092 | d16 | | |
| 17* | 184.462 | 5.243 | 1.54358 | 55.7 |
| 18* | −33.706 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 14

ZOOM LENS SYSTEM DATA
Zoom Ratio 3.30

| | Short Focal Length Extremity | Intermediate Focal Length | Long Focal Length Extremity |
|---|---|---|---|
| FNO. | 3.6 | 5.2 | 5.8 |
| f | 16.22 | 30.00 | 53.51 |
| W | 46.7 | 25.7 | 15.2 |
| Y | 14.20 | 14.20 | 14.20 |
| fB | 4.182 | 4.182 | 4.182 |
| L | 71.60 | 72.26 | 85.00 |
| d6 | 23.826 | 9.882 | 2.812 |
| d16 | 4.338 | 21.630 | 46.579 |
| d18 | 8.823 | 6.135 | 1.000 |

TABLE 15

Aspherical Surface Data (the aspherical surface
coefficients not indicated are zero (0.00)):

| Surf. No. | K | A4 | A6 | A8 |
|---|---|---|---|---|
| 3 | 0.000 | −0.8166E−04 | 0.4355E−06 | −0.1322E−08 |
| 4 | 0.000 | −0.1025E−03 | 0.4827E−06 | −0.1870E−08 |
| 8 | −2.446 | 0.7078E−04 | −0.1802E−06 | |
| 9 | 0.000 | 0.7306E−04 | −0.2240E−06 | |
| 17 | 0.000 | 0.5793E−05 | −0.9687E−09 | 0.1855E−10 |
| 18 | 0.000 | 0.1584E−04 | −0.4002E−07 | 0.7153E−10 |

TABLE 16

LENS GROUP DATA

| Lens Group | $1^{st}$ Surf. | Focal Length |
|---|---|---|
| 1 | 1 | −31.39 |
| 2 | 8 | 23.80 |
| (2A | 8 | 16.789) |
| (2B | 15 | −25.882) |
| 3 | 17 | 52.87 |

TABLE 17

DATA OF VARIABLE DISTANCES BETWEEN LENS GROUPS

| | Short Focal Length Extremity | Intermediate Focal Length | Long Focal Length Extremity |
|---|---|---|---|
| Object Dist. | Infinity | Infinity | Infinity |
| d6 | 23.826 | 9.882 | 2.812 |
| d14 | 1.266 | 1.266 | 1.266 |
| d16 | 4.338 | 21.630 | 46.579 |
| d18 | 8.823 | 6.135 | 1.000 |
| Object Dist. | 3 m | 3 m | 3 m |
| d6 | 23.826 | 9.882 | 2.812 |
| d14 | 1.266 | 1.337 | 1.402 |

TABLE 17-continued

DATA OF VARIABLE DISTANCES BETWEEN LENS GROUPS

| | Short Focal Length Extremity | Intermediate Focal Length | Long Focal Length Extremity |
|---|---|---|---|
| d16 | 4.158 | 21.400 | 46.443 |
| d18 | 9.003 | 6.294 | 1.000 |
| Object Dist. | 1 m | 1 m | 1 m |
| d6 | 23.826 | 9.882 | 2.812 |
| d14 | 1.266 | 1.478 | 1.674 |
| d16 | 3.809 | 20.945 | 46.171 |
| d18 | 9.352 | 6.608 | 1.000 |
| Object Dist. | 0.5 m | 0.5 m | 0.5 m |
| d6 | 23.826 | 9.882 | 2.812 |
| d14 | 1.266 | 1.688 | 2.086 |
| d16 | 3.309 | 20.270 | 45.759 |
| d18 | 9.852 | 7.073 | 1.000 |
| Object Dist. | 0.15 m | 0.2 m | 0.3 m |
| d6 | 23.826 | 9.882 | 2.812 |
| d14 | 1.266 | 2.296 | 2.643 |
| d16 | 1.277 | 18.309 | 45.202 |
| d18 | 11.884 | 8.426 | 1.000 |

TABLE 18

FOCUSING MOVEMENT AMOUNTS OF EACH LENS GROUP
(movement toward the image side is positive; movement toward the object side is negative)

| | Short Focal Length Extremity | Intermediate Focal Length | Long Focal Length Extremity |
|---|---|---|---|
| Object Dist. | 3 m | 3 m | 3 m |
| $1^{st}$ Lens Group | 0.000 | 0.000 | 0.000 |
| $1^{st}$ Sub-lens Group | 0.000 | 0.000 | 0.000 |
| $2^{nd}$ Sub-lens Group | 0.000 | 0.071 | 0.136 |
| $3^{rd}$ Lens Group | −0.180 | −0.159 | 0.000 |
| Object Dist. | 1 m | 1 m | 1 m |
| $1^{st}$ Lens Group | 0.000 | 0.000 | 0.000 |
| $1^{st}$ Sub-lens Group | 0.000 | 0.000 | 0.000 |
| $2^{nd}$ Sub-lens Group | 0.000 | 0.212 | 0.408 |
| $3^{rd}$ Lens Group | −0.529 | −0.473 | 0.000 |
| Object Dist. | 0.5 m | 0.5 m | 0.5 m |
| $1^{st}$ Lens Group | 0.000 | 0.000 | 0.000 |
| $1^{st}$ Sub-lens Group | 0.000 | 0.000 | 0.000 |
| $2^{nd}$ Sub-lens Group | 0.000 | 0.422 | 0.820 |
| $3^{rd}$ Lens Group | −1.029 | −0.938 | 0.000 |
| Object Dist. | 0.15 m | 0.2 m | 0.3 m |
| $1^{st}$ Lens Group | 0.000 | 0.000 | 0.000 |
| $1^{st}$ Sub-lens Group | 0.000 | 0.000 | 0.000 |
| $2^{nd}$ Sub-lens Group | 0.000 | 1.030 | 1.377 |
| $3^{rd}$ Lens Group | −3.061 | −2.291 | 0.000 |

[Numerical Embodiment 4]

Figure 13:
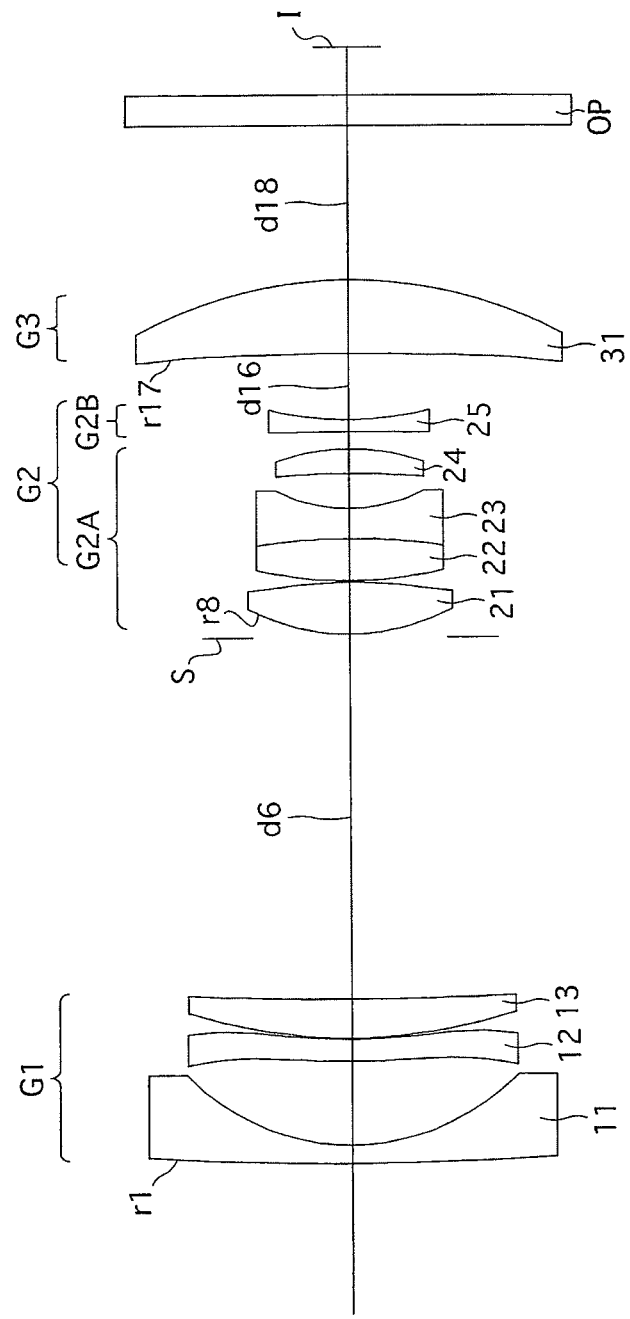
FIG. 13 shows a lens arrangement of a fourth numerical embodiment of a zoom lens system, according to the present invention, at the short focal length extremity when focused on an object at infinity.

FIGS. 13 through 16D and Tables 19 through 24 show a fourth numerical embodiment of a zoom lens system according to the present invention. FIG. 13 shows a lens arrangement of the fourth numerical embodiment when focused on an object at infinity at the short focal length extremity. FIGS. 14A, 14B, 14C and 14D show various aberrations that occurred in the lens arrangement shown in FIG. 13 at the short focal length extremity when focused on an object at infinity. FIGS. 15A, 15B, 15C and 15D show various aberrations that occurred in the lens arrangement shown in FIG. 13 at an intermediate focal length when focused on an object at infinity. FIGS. 16A, 16B, 16C and 16D show various aberrations that occurred in the lens arrangement shown in FIG. 13 at the long focal length extremity when focused on an object at infinity. Table 19 shows the lens surface data, Table 20 shows various zoom lens system data, Table 21 shows the aspherical surface data, Table 22 shows the lens group data of the zoom lens system, Table 23 shows data of the variable distances between each lens group at various object distances, and Table 24 shows the focusing movement amounts of each lens group at various object distances, according to the fourth numerical embodiment.

The lens arrangement of the fourth numerical embodiment is the same as that of the first numerical embodiment except that the positive lens element 31 of the third lens group G3 is a positive meniscus lens element having a convex surface on the image side.

TABLE 19

SURFACE DATA

| Surf. No. | r | d | Nd | νd |
|---|---|---|---|---|
| 1 | 232.866 | 1.200 | 1.80420 | 46.5 |
| 2 | 15.783 | 5.522 | | |
| 3* | 55.984 | 1.400 | 1.54358 | 55.7 |
| 4* | 31.854 | 0.109 | | |
| 5 | 37.066 | 2.557 | 1.84666 | 23.8 |
| 6 | 241.925 | d6 | | |
| 7(Diaphragm) | ∞ | 0.200 | | |
| 8* | 14.361 | 3.458 | 1.69350 | 53.2 |
| 9* | −31.575 | 0.100 | | |
| 10 | 28.472 | 2.793 | 1.48749 | 70.4 |
| 11 | −42.946 | 2.000 | 1.69895 | 30.0 |
| 12 | 11.207 | 2.353 | | |
| 13 | −55.437 | 1.614 | 1.69680 | 55.5 |
| 14 | −15.296 | 1.164 | | |
| 15 | −263.247 | 0.800 | 1.72916 | 54.7 |
| 16 | 23.246 | d16 | | |
| 17* | −283.576 | 4.922 | 1.54358 | 55.7 |
| 18* | −28.643 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 20

ZOOM LENS SYSTEM DATA
Zoom Ratio 3.30

| | Short Focal Length Extremity | Intermediate Focal Length | Long Focal Length Extremity |
|---|---|---|---|
| FNO. | 3.6 | 5.2 | 5.8 |
| f | 16.22 | 29.74 | 53.51 |
| W | 46.0 | 25.4 | 14.9 |
| Y | 14.20 | 14.20 | 14.20 |
| fB | 3.181 | 3.181 | 3.181 |
| L | 73.96 | 73.72 | 85.00 |
| d6 | 24.001 | 9.960 | 2.082 |
| d16 | 4.388 | 22.117 | 46.545 |
| d18 | 10.202 | 6.266 | 1.000 |

TABLE 21

Aspherical Surface Data (the aspherical surface coefficients not indicated are zero (0.00)):

| Surf. No. | K | A4 | A6 | A8 |
|---|---|---|---|---|
| 3 | 0.000 | −0.1252E−03 | 0.4141E−06 | −0.1069E−08 |
| 4 | 0.000 | −0.1457E−03 | 0.4617E−06 | −0.1260E−08 |
| 8 | −1.456 | 0.2128E−04 | 0.7923E−07 | |
| 9 | 0.000 | 0.6995E−04 | −0.1187E−06 | |
| 17 | 0.000 | 0.1646E−05 | −0.5232E−07 | 0.4156E−10 |
| 18 | 0.000 | 0.2021E−04 | −0.8821E−07 | 0.8400E−10 |

TABLE 22

LENS GROUP DATA

| Lens Group | 1st Surf. | Focal Length |
|---|---|---|
| 1 | 1 | −31.03 |
| 2 | 8 | 24.01 |
| (2A | 8 | 17.744) |
| (2B | 15 | −29.260) |
| 3 | 17 | 58.22 |

TABLE 23

DATA OF VARIABLE DISTANCES BETWEEN LENS GROUPS

|  | Short Focal Length Extremity | Intermediate Focal Length | Long Focal Length Extremity |
|---|---|---|---|
| Object Dist. | Infinity | Infinity | Infinity |
| d6 | 24.001 | 9.960 | 2.082 |
| d14 | 1.164 | 1.164 | 1.164 |
| d16 | 4.388 | 22.117 | 46.545 |
| d18 | 10.202 | 6.266 | 1.000 |
| Object Dist. | 3 m | 3 m | 3 m |
| d6 | 24.001 | 9.960 | 2.082 |
| d14 | 1.164 | 1.247 | 1.310 |
| d16 | 4.188 | 21.870 | 46.106 |
| d18 | 10.402 | 6.430 | 1.293 |
| Object Dist. | 1 m | 1 m | 1 m |
| d6 | 24.001 | 9.960 | 2.082 |
| d14 | 1.164 | 1.410 | 1.603 |
| d16 | 3.799 | 21.381 | 45.227 |
| d18 | 10.791 | 6.756 | 1.879 |
| Object Dist. | 0.5 m | 0.5 m | 0.5 m |
| d6 | 24.001 | 9.960 | 2.082 |
| d14 | 1.164 | 1.651 | 2.043 |
| d16 | 3.246 | 20.657 | 43.908 |
| d18 | 11.344 | 7.239 | 2.758 |
| Object Dist. | 0.15 m | 0.2 m | 0.3 m |
| d6 | 24.001 | 9.960 | 2.082 |
| d14 | 1.164 | 2.352 | 2.630 |
| d16 | 1.026 | 18.555 | 42.148 |
| d18 | 13.564 | 8.640 | 3.931 |

TABLE 24

FOCUSING MOVEMENT AMOUNTS OF EACH LENS GROUP
(movement toward the image side is positive; movement toward the object side is negative)

|  | Short Focal Length Extremity | Intermediate Focal Length | Long Focal Length Extremity |
|---|---|---|---|
| Object Dist. | 3 m | 3 m | 3 m |
| 1st Lens Group | 0.000 | 0.000 | 0.000 |
| 1st Sub-lens Group | 0.000 | 0.000 | 0.000 |
| 2nd Sub-lens Group | 0.000 | 0.083 | 0.146 |
| 3rd Lens Group | −0.200 | −0.164 | −0.293 |
| Object Dist. | 1 m | 1 m | 1 m |
| 1st Lens Group | 0.000 | 0.000 | 0.000 |
| 1st Sub-lens Group | 0.000 | 0.000 | 0.000 |
| 2nd Sub-lens Group | 0.000 | 0.246 | 0.439 |
| 3rd Lens Group | −0.589 | −0.490 | −0.879 |
| Object Dist. | 0.5 m | 0.5 m | 0.5 m |
| 1st Lens Group | 0.000 | 0.000 | 0.000 |
| 1st Sub-lens Group | 0.000 | 0.000 | 0.000 |
| 2nd Sub-lens Group | 0.000 | 0.487 | 0.879 |
| 3rd Lens Group | −1.142 | −0.973 | −1.758 |
| Object Dist. | 0.15 m | 0.2 m | 0.3 m |
| 1st Lens Group | 0.000 | 0.000 | 0.000 |
| 1st Sub-lens Group | 0.000 | 0.000 | 0.000 |
| 2nd Sub-lens Group | 0.000 | 1.188 | 1.466 |
| 3rd Lens Group | −3.362 | −2.374 | −2.931 |

[Numerical Embodiment 5]

Figure 17:
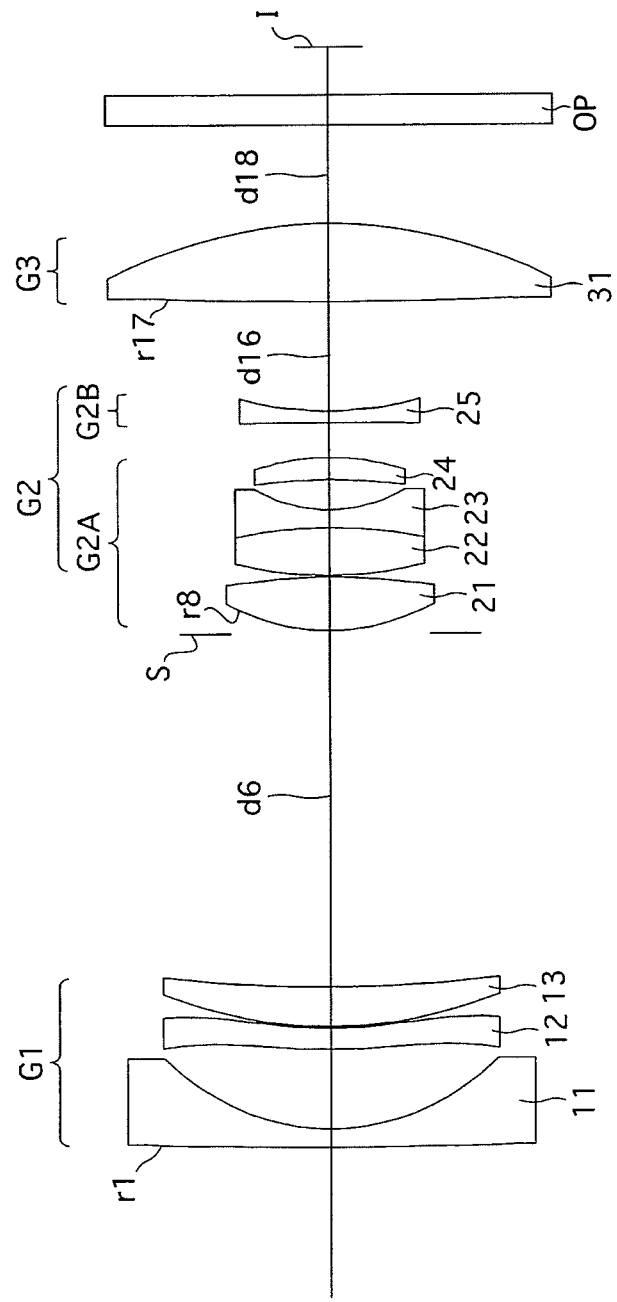
FIG. 17 shows a lens arrangement of a fifth numerical embodiment of a zoom lens system, according to the present invention, at the short focal length extremity when focused on an object at infinity.
Figure 20A:
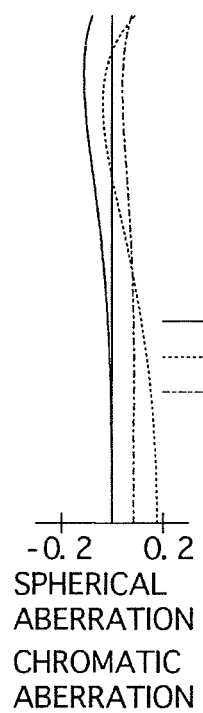
FIGS. 20A, 20B, 20C and 20D show various aberrations that occurred in the lens arrangement of FIG. 17, at the long focal length extremity.
Figure 20B:
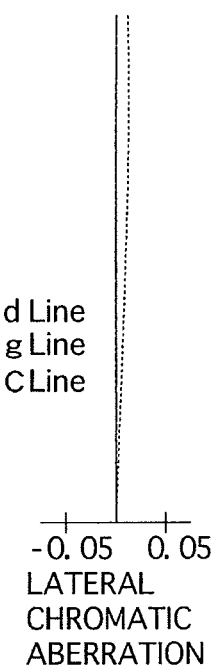
Figure 20C:
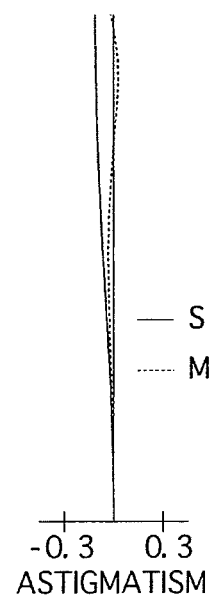
Figure 20D:
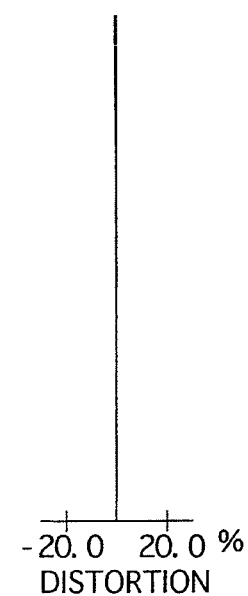

FIGS. 17 through 20D and Tables 25 through 30 show a fifth numerical embodiment of a zoom lens system according to the present invention. FIG. 17 shows a lens arrangement of the fifth numerical embodiment when focused on an object at infinity at the short focal length extremity. FIGS. 18A, 18B, 18C and 18D show various aberrations that occurred in the lens arrangement shown in FIG. 17 at the short focal length extremity when focused on an object at infinity. FIGS. 19A, 19B, 19C and 19D show various aberrations that occurred in the lens arrangement shown in FIG. 17 at an intermediate focal length when focused on an object at infinity. FIGS. 20A, 20B, 20C and 20D show various aberrations that occurred in the lens arrangement shown in FIG. 17 at the long focal length extremity when focused on an object at infinity. Table 25 shows the lens surface data, Table 26 shows various zoom lens system data, Table 27 shows the aspherical surface data, Table 28 shows the lens group data of the zoom lens system, Table 29 shows data of the variable distances between each lens group at various object distances, and Table 30 shows the focusing movement amounts of each lens group at various object distances, according to the fifth numerical embodiment.

The lens arrangement of the fifth numerical embodiment is the same as that of the first numerical embodiment.

TABLE 25

SURFACE DATA

| Surf. No. | r | d | Nd | νd |
|---|---|---|---|---|
| 1 | 500.000 | 1.200 | 1.80420 | 46.5 |
| 2 | 15.945 | 5.228 | | |
| 3* | 42.360 | 1.400 | 1.54358 | 55.7 |
| 4* | 27.963 | 0.105 | | |
| 5 | 30.983 | 2.617 | 1.84666 | 23.8 |
| 6 | 98.717 | d6 | | |
| 7(Diaphragm) | ∞ | 0.200 | | |
| 8* | 13.791 | 3.542 | 1.69350 | 53.2 |
| 9* | −36.511 | 0.100 | | |
| 10 | 27.027 | 3.180 | 1.61800 | 63.4 |
| 11 | −29.985 | 1.200 | 1.67270 | 32.2 |
| 12 | 10.191 | 1.994 | | |
| 13 | −37.815 | 1.477 | 1.72916 | 54.7 |
| 14 | −16.106 | 2.299 | | |
| 15 | −503.778 | 0.800 | 1.77250 | 49.6 |
| 16 | 24.493 | d16 | | |
| 17* | 335.379 | 5.187 | 1.54358 | 55.7 |
| 18* | −28.721 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 26

ZOOM LENS SYSTEM DATA
Zoom Ratio 3.30

|  | Short Focal Length Extremity | Intermediate Focal Length | Long Focal Length Extremity |
|---|---|---|---|
| FNO. | 2.9 | 4.1 | 5.7 |
| f | 16.22 | 29.34 | 53.51 |
| W | 47.1 | 25.9 | 15.0 |
| Y | 14.20 | 14.20 | 14.20 |
| fB | 3.182 | 3.182 | 3.182 |
| L | 72.89 | 72.25 | 85.00 |
| d6 | 23.448 | 9.930 | 2.514 |
| d16 | 7.235 | 21.860 | 45.775 |
| d18 | 6.500 | 4.746 | 1.000 |

TABLE 27

Aspherical Surface Data (the aspherical surface coefficients not indicated are zero (0.00)):

| Surf. No. | K | A4 | A6 | A8 |
|---|---|---|---|---|
| 3 | 0.000 | −0.1206E−03 | 0.3393E−06 | −0.7784E−09 |
| 4 | 0.000 | −0.1400E−03 | 0.4050E−06 | −0.1029E−08 |
| 8 | −1.042 | 0.2580E−05 | 0.1078E−06 | |
| 9 | 0.000 | 0.6311E−04 | −0.9766E−07 | |
| 17 | 0.000 | −0.2043E−05 | 0.3878E−07 | −0.1706E−09 |
| 18 | 0.000 | 0.1416E−04 | 0.1754E−07 | −0.1572E−09 |

TABLE 28

LENS GROUP DATA

| Lens Group | 1st Surf. | Focal Length |
|---|---|---|
| 1 | 1 | −29.65 |
| 2 | 8 | 22.80 |
| (2A | 8 | 17.657) |
| (2B | 15 | −30.216) |
| 3 | 17 | 48.91 |

TABLE 29

DATA OF VARIABLE DISTANCES BETWEEN LENS GROUPS

| | Short Focal Length Extremity | Intermediate Focal Length | Long Focal Length Extremity |
|---|---|---|---|
| Object Dist. | Infinity | Infinity | Infinity |
| d6 | 23.448 | 9.930 | 2.514 |
| d14 | 2.299 | 2.299 | 2.299 |
| d16 | 7.235 | 21.860 | 45.775 |
| d18 | 6.500 | 4.750 | 1.000 |
| Object Dist. | 3 m | 3 m | 3 m |
| d6 | 23.448 | 9.930 | 2.514 |
| d14 | 2.309 | 2.380 | 2.446 |
| d16 | 7.044 | 21.551 | 44.980 |
| d18 | 6.681 | 4.978 | 1.648 |
| Object Dist. | 1 m | 1 m | 1 m |
| d6 | 23.448 | 9.930 | 2.514 |
| d14 | 2.326 | 2.541 | 2.737 |
| d16 | 6.675 | 20.953 | 43.502 |
| d18 | 7.033 | 5.415 | 2.835 |
| Object Dist. | 0.5 m | 0.5 m | 0.5 m |
| d6 | 23.448 | 9.930 | 2.514 |
| d14 | 2.351 | 2.780 | 3.169 |
| d16 | 6.150 | 20.097 | 41.486 |
| d18 | 7.533 | 6.032 | 4.419 |
| Object Dist. | 0.15 m | 0.2 m | 0.3 m |
| d6 | 23.448 | 9.930 | 2.514 |
| d14 | 2.451 | 3.489 | 3.739 |
| d16 | 4.055 | 17.755 | 39.058 |
| d18 | 9.528 | 7.665 | 6.277 |

TABLE 30

FOCUSING MOVEMENT AMOUNTS OF EACH LENS GROUP
(movement toward the image side is positive; movement toward the object side is negative)

| | Short Focal Length Extremity | Intermediate Focal Length | Long Focal Length Extremity |
|---|---|---|---|
| Object Dist. | Infinity | Infinity | Infinity |
| | 3 m | 3 m | 3 m |
| 1st Lens Group | 0.000 | 0.000 | 0.000 |
| 1st Sub-lens Group | 0.000 | 0.000 | 0.000 |
| 2nd Sub-lens Group | 0.010 | 0.081 | 0.147 |
| 3rd Lens Group | −0.181 | −0.228 | −0.648 |
| Object Dist. | 1 m | 1 m | 1 m |

TABLE 30-continued

FOCUSING MOVEMENT AMOUNTS OF EACH LENS GROUP
(movement toward the image side is positive; movement toward the object side is negative)

| | Short Focal Length Extremity | Intermediate Focal Length | Long Focal Length Extremity |
|---|---|---|---|
| 1st Lens Group | 0.000 | 0.000 | 0.000 |
| 1st Sub-lens Group | 0.000 | 0.000 | 0.000 |
| 2nd Sub-lens Group | 0.027 | 0.242 | 0.438 |
| 3rd Lens Group | −0.533 | −0.665 | −1.835 |
| Object Dist. | 0.5 m | 0.5 m | 0.5 m |
| 1st Lens Group | 0.000 | 0.000 | 0.000 |
| 1st Sub-lens Group | 0.000 | 0.000 | 0.000 |
| 2nd Sub-lens Group | 0.052 | 0.481 | 0.870 |
| 3rd Lens Group | −1.033 | −1.282 | −3.419 |
| Object Dist. | 0.15 m | 0.2 m | 0.3 m |
| 1st Lens Group | 0.000 | 0.000 | 0.000 |
| 1st Sub-lens Group | 0.000 | 0.000 | 0.000 |
| 2nd Sub-lens Group | 0.152 | 1.190 | 1.440 |
| 3rd Lens Group | −3.028 | −2.915 | −5.277 |

The numerical values of each condition for each embodiment are shown in Table 31. The corresponding values of condition (1) are indicated in the following order of object distances: 3 m, 1 m, 0.5 m and 0.15 m. The corresponding values of condition (2) are indicated in the following order of object distances at the intermediate focal length: 3 m, 1 m, 0.5 m and 0.2 m; and are indicated in the following order of object distances at the long focal length extremity: 3 m, 1 m, 0.5 m and 0.3 m.

TABLE 31

First Numerical Embodiment

| | |
|---|---|
| Cond. (1) | 0.041, 0.040, 0.040, 0.040 |
| Cond. (2) (Intermediate Focal Length) | −5.060, −5.000, −5.014, −5.001 |
| Cond. (2) (Long Focal Length Extremity) | −12.477, −12.480, −12.503, −12.500 |
| Cond. (3) | −0.956 |
| Cond. (4) | 0.694 |
| Cond. (5) | 55.46 |
| Cond. (6) | 0.063 |
| Cond. (7) | 1.175 |
| Cond. (8) | 0.178 |
| Cond. (9) | 1.05 |

Second Numerical Embodiment

| | |
|---|---|
| Cond. (1) | 0.000, 0.000, 0.000, 0.000 |
| Cond. (2) (Intermediate Focal Length) | −6.947, −6.658, −6.659, −6.671 |
| Cond. (2) (Long Focal Length Extremity) | −31.917, −30.313, −27.705, −23.960 |
| Cond. (3) | −1.051 |
| Cond. (4) | 1.313 |
| Cond. (5) | 55.46 |
| Cond. (6) | 0.063 |
| Cond. (7) | 1.155 |
| Cond. (8) | 0.160 |
| Cond. (9) | 1.05 |

Third Numerical Embodiment

| | |
|---|---|
| Cond. (1) | 0.000, 0.000, 0.000, 0.000 |
| Cond. (2) (Intermediate Focal Length) | −2.239, −2.231, −2.223, −2.224 |
| Cond. (2) (Long Focal Length Extremity) | 0.000, 0.000, 0.000, 0.000 |
| Cond. (3) | −0.920 |
| Cond. (4) | 0.891 |
| Cond. (5) | 55.46 |
| Cond. (6) | 0.061 |
| Cond. (7) | 1.206 |

TABLE 31-continued

| Cond. (8) | 0.179 |
|---|---|
| Cond. (9) | 1.05 |
| Fourth Numerical Embodiment | |
| Cond. (1) | 0.000, 0.000, 0.000, 0.000 |
| Cond. (2) (Intermediate Focal Length) | −1.976, −1.992, −1.998, −1.998 |
| Cond. (2) (Long Focal Length Extremity) | −2.007, −2.002, −2.000, −1.999 |
| Cond. (3) | −0.821 |
| Cond. (4) | 0.838 |
| Cond. (5) | 54.67 |
| Cond. (6) | 0.056 |
| Cond. (7) | 1.210 |
| Cond. (8) | 0.224 |
| Cond. (9) | 1.05 |
| Fifth Numerical Embodiment | |
| Cond. (1) | −0.055, −0.051, −0.050, −0.050 |
| Cond. (2) (Intermediate Focal Length) | −2.815, −2.748, −2.665, −2.450 |
| Cond. (2) (Long Focal Length Extremity) | −3.812, −4.189, −3.930, −3.665 |
| Cond. (3) | −0.755 |
| Cond. (4) | 0.907 |
| Cond. (5) | 49.6 |
| Cond. (6) | 0.055 |
| Cond. (7) | 1.145 |
| Cond. (8) | 0.189 |
| Cond. (9) | 1.05 |

As can be understood from Table 31, the first through fifth embodiments satisfy conditions (1) through (9). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group, and a positive third lens group, in that order from the object side, wherein upon zooming from the short focal length extremity to the long focal length extremity, the distance between said first lens group and said second lens group decreases, and the distance between said second lens group and said third lens group increases,
   wherein said second lens group includes a positive first sub-lens group and a negative second sub-lens group, in that order from the object side, and
   wherein, in at least part of the zooming range of said zoom lens system, said second sub-lens group and said third lens group each serves as a focusing lens group that is moved along the optical axis during a focusing operation.

2. The zoom lens system according to claim 1, wherein said zoom lens system comprises a zooming range in which only said third lens group serves as a focusing lens group, and a zooming range in which said second sub-lens group and said third lens group each serves as a focusing lens group.

3. The zoom lens system according to claim 1, wherein the focusing movement amount of said second sub-lens group is less than the focusing movement amount of said third lens group at the short focal length extremity.

4. The zoom lens system according to claim 1, wherein the following condition (1) is satisfied:

$$-0.5 < dW2B/dW3 < 0.2 \qquad (1),$$

wherein
   dW2B designates the focusing movement amount of said second sub-lens group at the short focal length extremity when focused at an arbitrary object distance, wherein a movement direction of said second sub-lens group toward the image side designates a positive focusing-movement direction, and a movement direction of said second sub-lens group toward the object side designates a negative focusing-movement direction, and
   dW3 designates the focusing movement amount of said third lens group at the short focal length extremity when focused at said arbitrary object distance, wherein a movement direction of said third lens group toward the image side designates a positive focusing-movement direction, and a movement direction of said third lens group toward the object side designates a negative focusing-movement direction.

5. The zoom lens system according to claim 1, wherein the ratio of focusing movement amount of the third lens group to the focusing movement amount of the second sub-lens group changes in accordance with a change in the focal length during zooming, wherein the following condition (2) is satisfied:

$$-50 < dX3/dX2B \leq 0 \qquad (2),$$

wherein
   dX3 designates the focusing movement amount of said third lens group at a focal length in a range from an intermediate focal length through to the long focal length extremity when focused at an arbitrary object distance, wherein a movement direction of said third lens group toward the image side designates a positive focusing-movement direction, and a movement direction of said third lens group toward the object side designates a negative focusing-movement direction, and
   dX2B designates the focusing movement amount of said second sub-lens group at said focal length in said range from the intermediate focal length through to the long focal length extremity when focused at said arbitrary object distance, wherein a movement direction of said second sub-lens group toward the image side designates a positive focusing-movement direction, and a movement direction of said second sub-lens group toward the object side designates a negative focusing-movement direction.

6. The zoom lens system according to claim 1, wherein said second sub-lens group and said third lens group each serves as a focusing lens group in a zooming range from an intermediate focal length fm to the long focal length extremity,
   wherein $fm=(fw*ft)^{1/2}$, wherein fw designates the focal length of the entire zoom lens system at the short focal length extremity, and ft designates the focal length of the entire zoom lens system at the long focal length extremity.

7. The zoom lens system according to claim 1, wherein the ratio of the focusing movement amounts of said second sub-lens group and said third lens group changes in accordance with the object distance.

8. The zoom lens system according to claim 1, wherein the following condition (3) is satisfied:

$$-1.5 < F2/F2B < -0.7 \tag{3}$$

wherein

F2 designates the focal length of said second lens group, and

F2B designates the focal length of said second sub-lens group.

9. The zoom lens system according to claim 1, wherein said second sub-lens group comprises a negative single lens element.

10. The zoom lens system according to claim 9, wherein the following condition (4) is satisfied:

$$0 < (RA+RB)/(RA-RB) < 3 \tag{4}$$

wherein

RA designates the radius of curvature of the surface on the object side of said negative single lens element of said second sub-lens group, and RB designates the radius of curvature of the surface on the image side of said negative single lens element of said second sub-lens group.

11. The zoom lens system according to claim 9, wherein the following condition (5) is satisfied:

$$\nu 2B > 45 \tag{5}$$

wherein

ν2B designates the Abbe number with respect to the d-line of said negative single lens element of said second sub-lens group.

12. The zoom lens system according to claim 1, wherein the following condition (6) is satisfied:

$$T2B/T2 < 0.1 \tag{6}$$

wherein

T2B designates the distance along the optical axis from the surface of said second sub-lens group that is closest to the object side to the surface of said second sub-lens group that is closest to the image side, and T2 designates the distance along the optical axis from the surface of said second lens group that is closest to the object side to the surface of said second lens group that is closest to the image side.

13. The zoom lens system according to claim 1, wherein the following condition (7) is satisfied:

$$1.05 < M3T/M3W < 1.35 \tag{7}$$

wherein

M3T designates the lateral magnification of said third lens group when focused on an object at infinity at the long focal length extremity, and M3W designates the lateral magnification of said third lens group when focused on an object at infinity at the short focal length extremity.

14. The zoom lens system according to claim 1, wherein said first sub-lens group comprises a positive lens element, a positive lens element, a negative lens element, and a positive lens element, in that order from the object side.

15. The zoom lens system according to claim 1, wherein said first lens group comprises a negative lens element, a negative lens element having an aspherical surface on at least one side thereof, and a positive lens element, in that order from the object side, wherein the following condition (8) is satisfied:

$$0 < F1/FA < 0.4 \tag{8}$$

wherein

F1 designates the focal length of said first lens group, and

FA designates the focal length of said negative lens element, of said first lens group, having an aspherical surface on at least one side thereof.

16. The zoom lens system according to claim 1, wherein said third lens group comprises a positive single lens element, and wherein the following condition (9) is satisfied:

$$SG3 < 1.5 \tag{9}$$

wherein

SG3 designates the specific gravity of said positive single lens element of said third lens group.

* * * * *